E. J. BRASSEUR.
ENVELOP SEALING AND STAMPING APPARATUS.
APPLICATION FILED SEPT. 14, 1904.
1,002,194.  Patented Aug. 29, 1911.
7 SHEETS—SHEET 6.
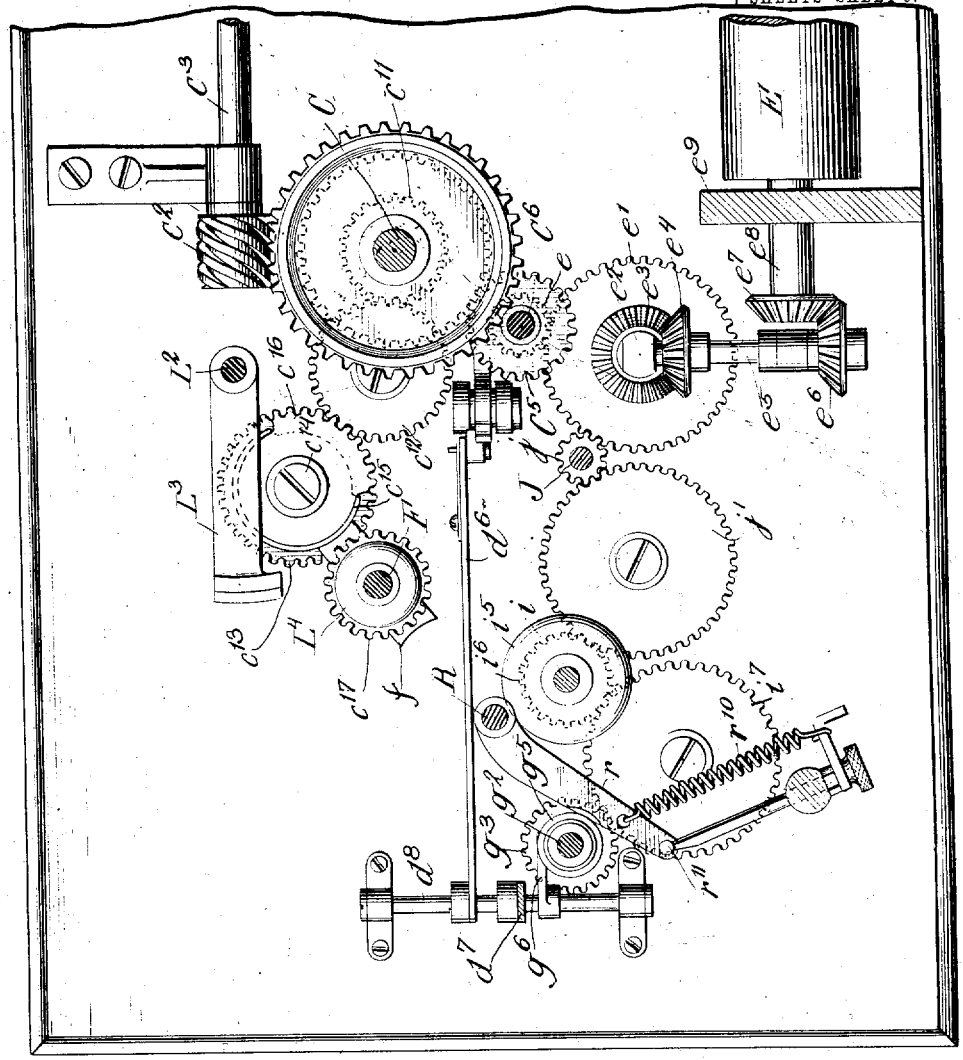
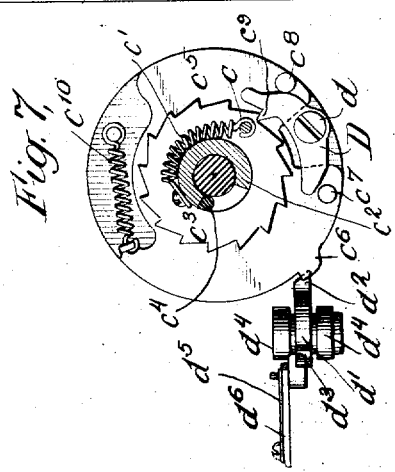
WITNESSES:
INVENTOR
Ernest J. Brasseur
BY
ATTORNEY

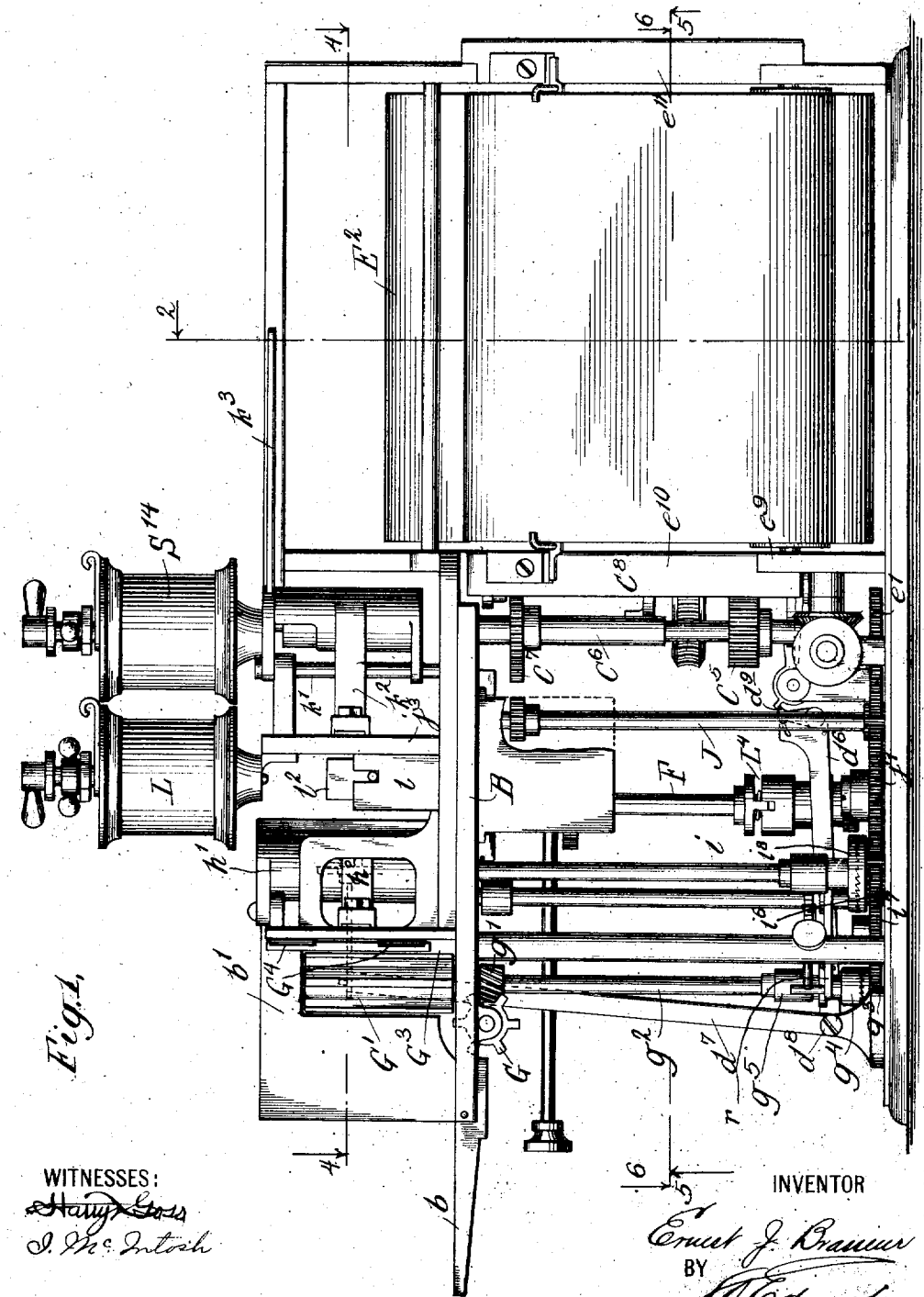

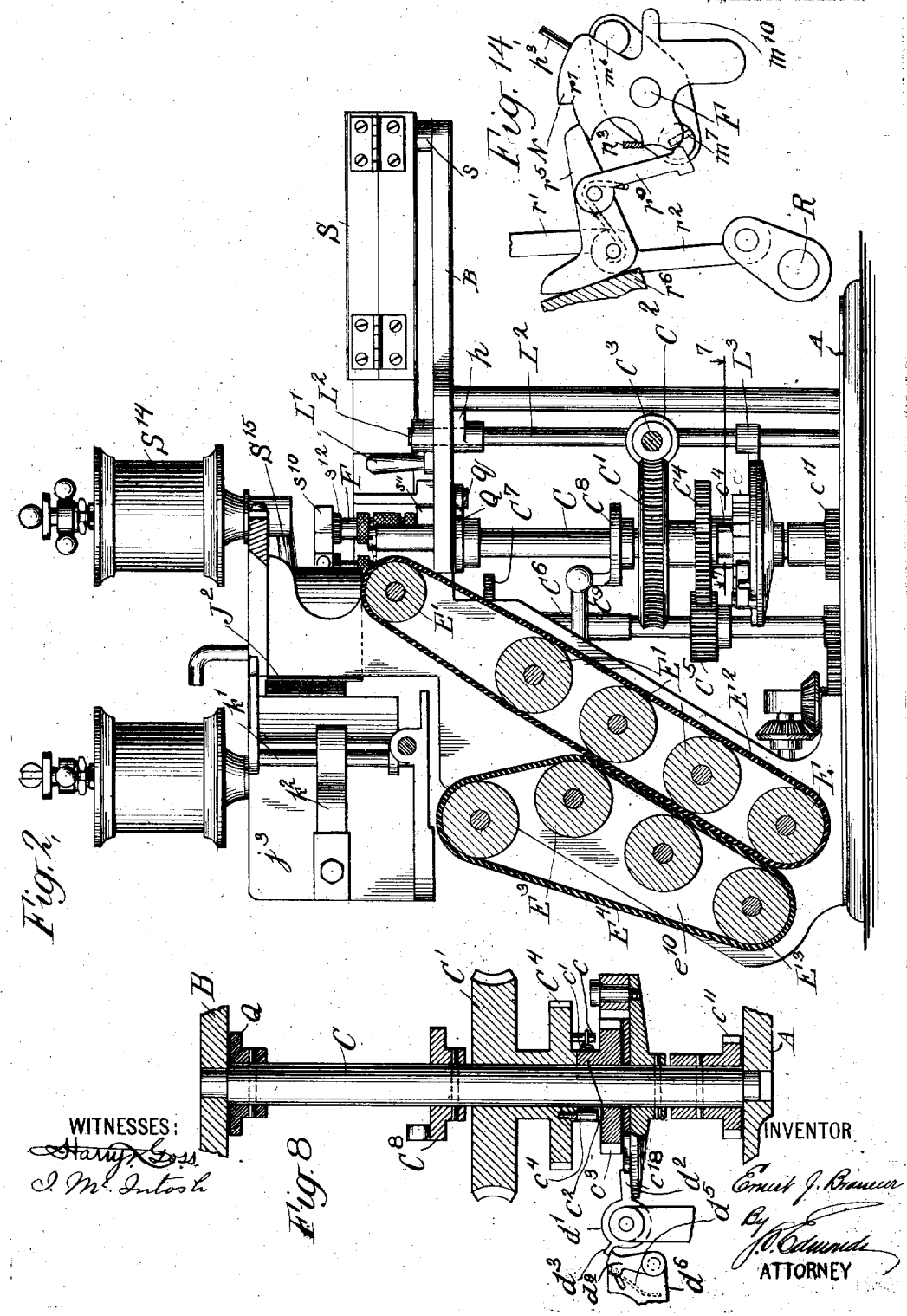

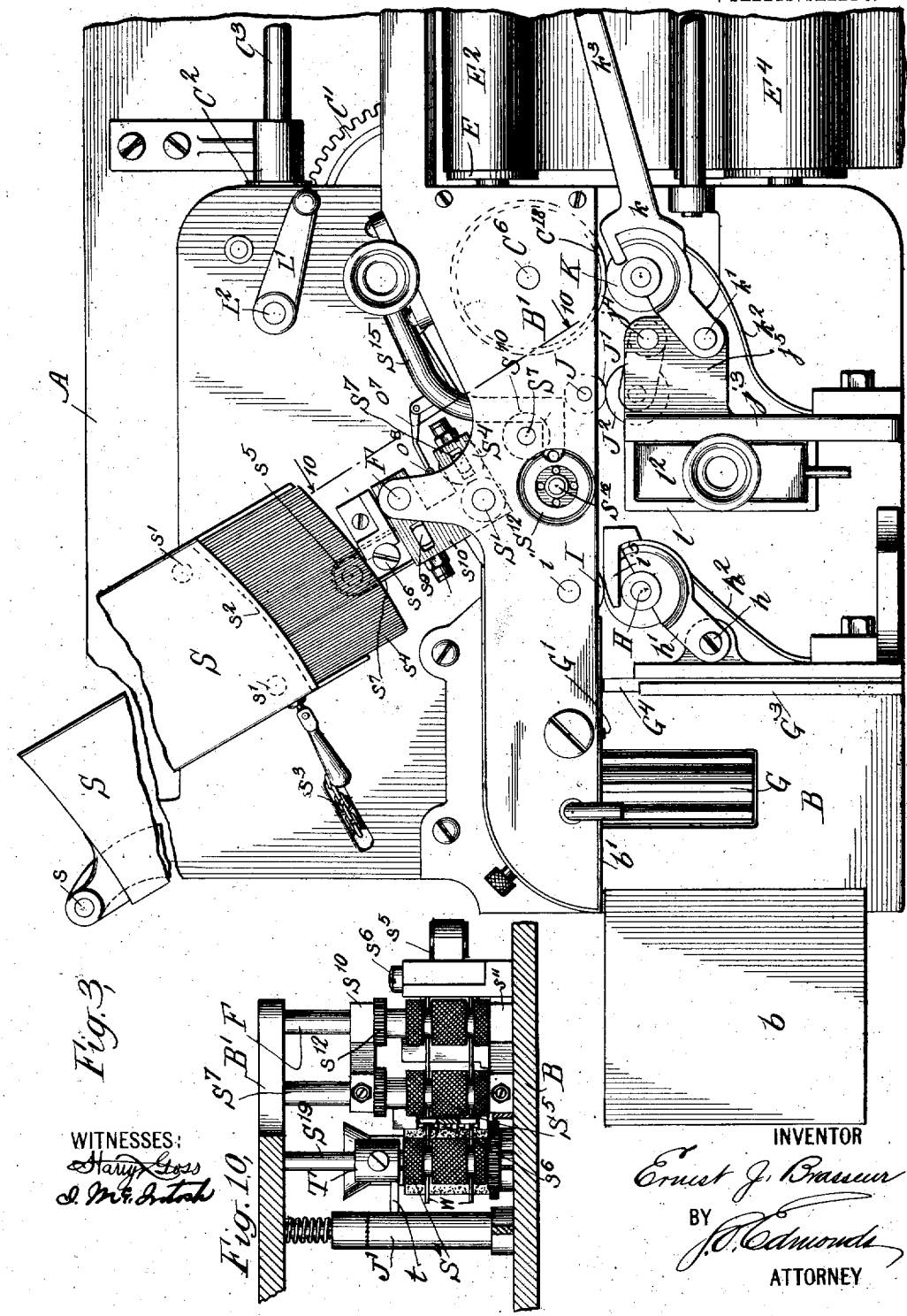

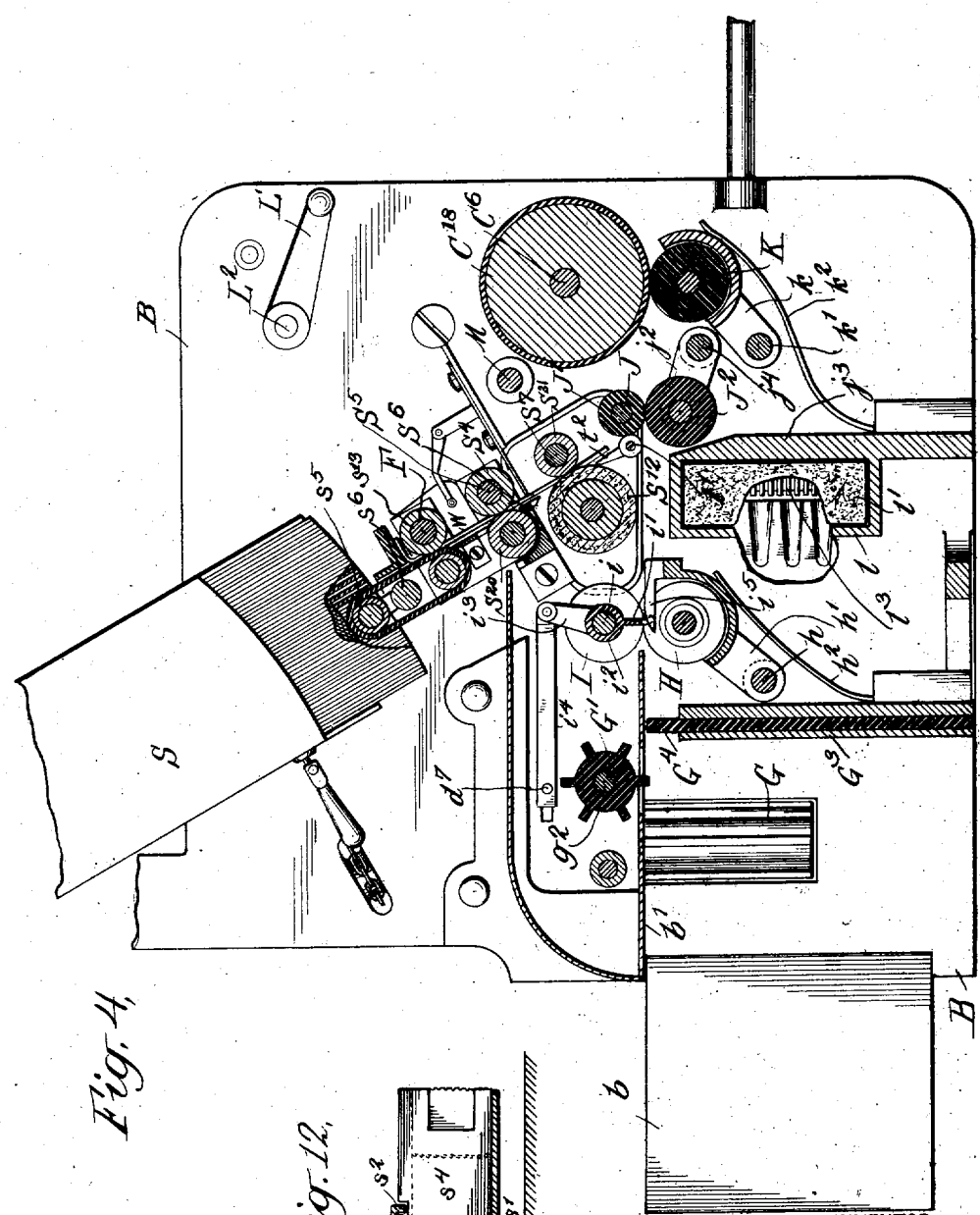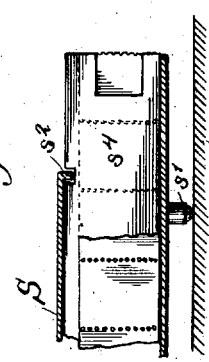

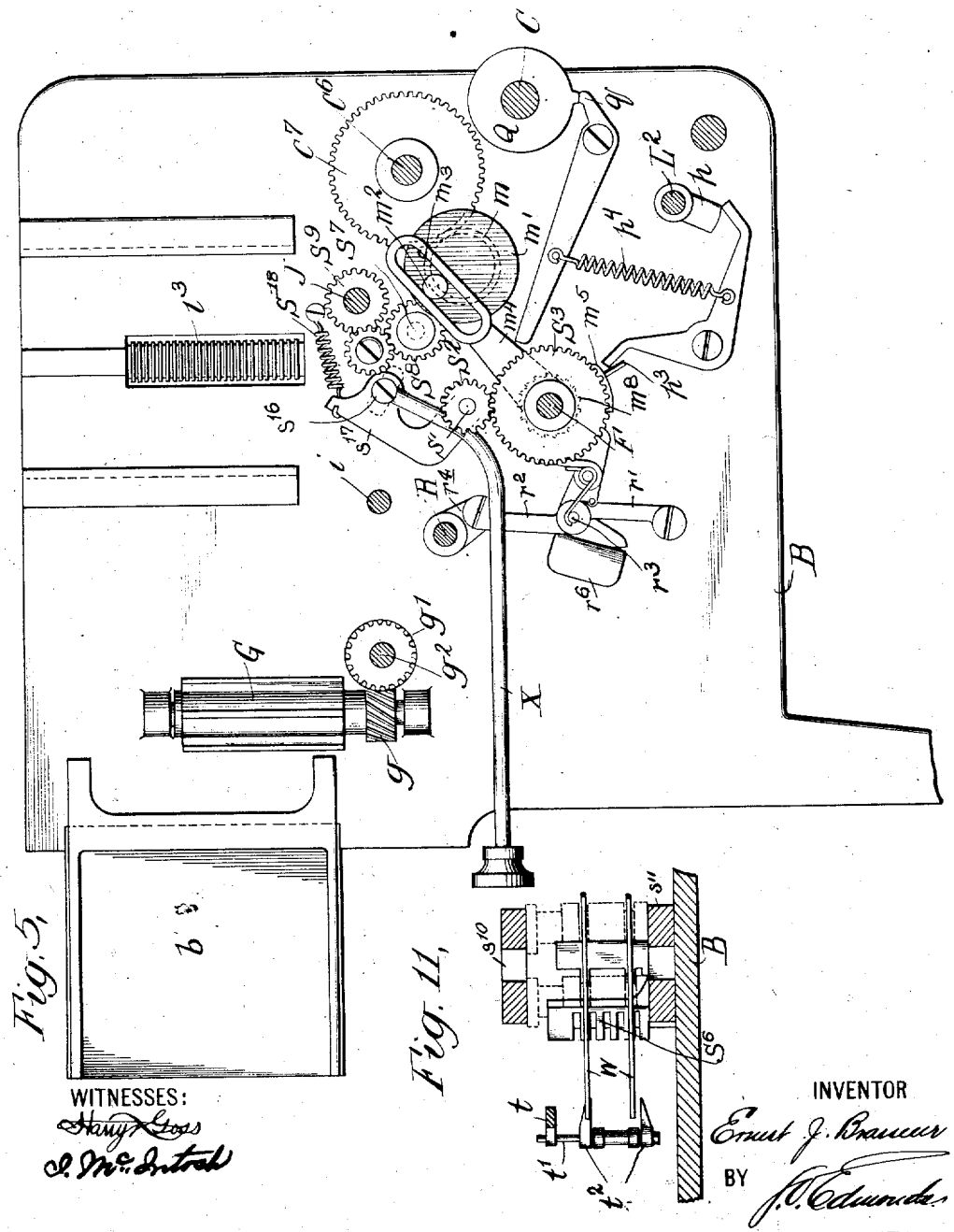

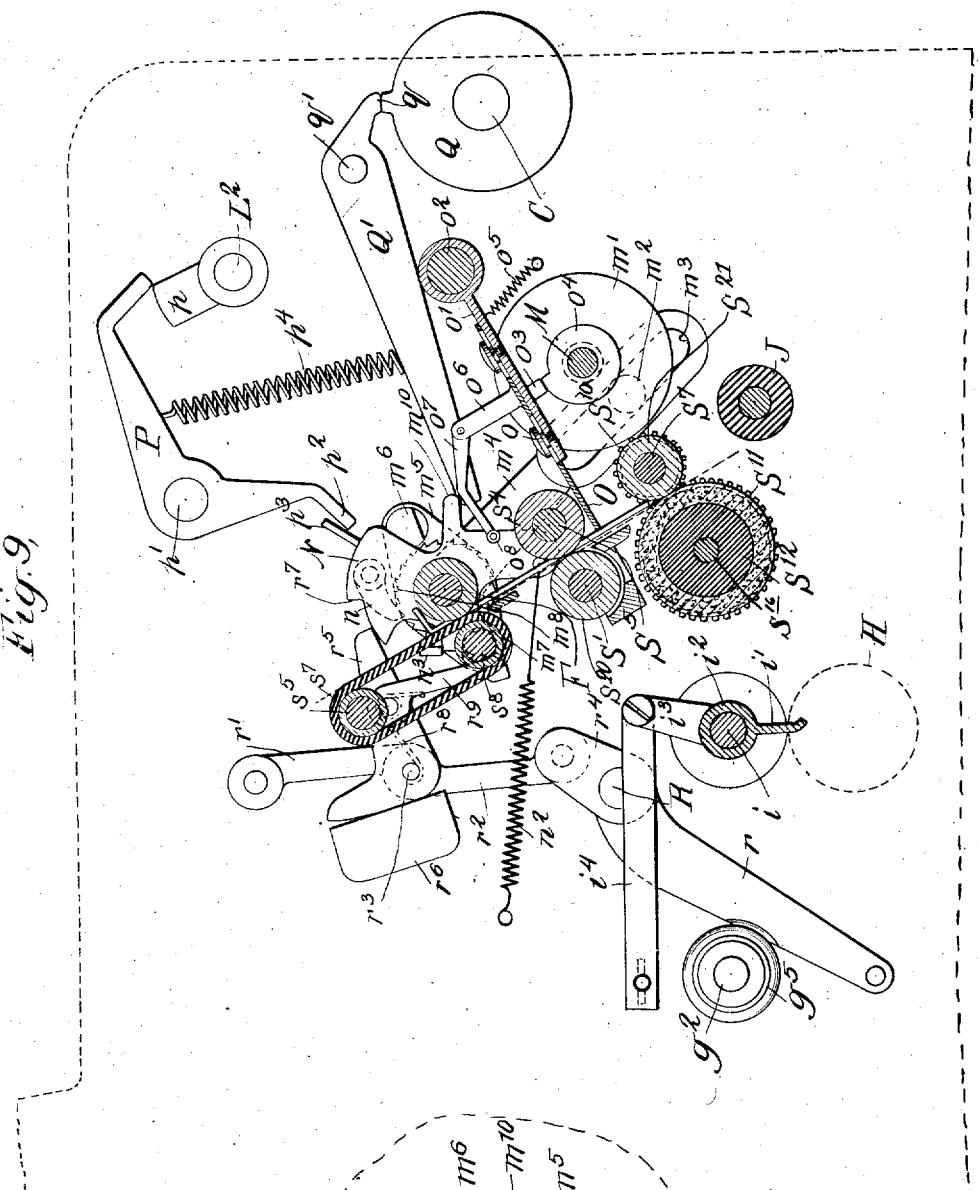

UNITED STATES PATENT OFFICE.

ERNEST J. BRASSEUR, OF CHICAGO, ILLINOIS, ASSIGNOR TO A. B. DICK COMPANY, OF CHICAGO, ILLINOIS, A CORPORATION OF ILLINOIS.

ENVELOP SEALING AND STAMPING APPARATUS.

1,002,194.  Specification of Letters Patent.  Patented Aug. 29, 1911.

Application filed September 14, 1904. Serial No. 224,417.

*To all whom it may concern:*

Be it known that I, ERNEST J. BRASSEUR, a subject of the King of Belgium, residing at Chicago, in the county of Cook and State of Illinois, have invented a certain new and useful Improvement in Envelop Sealing and Stamping Apparatus, of which the following is a specification.

The object of the present invention is to provide a mechanism of a compact and reliable character for automatically sealing envelops and affixing stamps thereto.

A further object is to provide means for readily and conveniently changing the mode of operation of the apparatus and to adapt the same either for envelop-sealing alone, for stamp-affixing alone, or for both envelop-sealing and for stamp-affixing.

A further object is to provide a device for automatically feeding stamps to the affixing mechanism and means for throwing such device out of operation upon the failure of an envelop to reach a position at which the device is designed to act.

Further objects of the invention will be made to appear during the detailed description of the mechanism.

In carrying out the invention I employ, speaking generally, a single source of power and actuating connections therefrom to the operating parts. The envelops are fed over a suitable table and successively acted upon by the feed mechanism carrying them in the order named into coaction with the moistener acting upon the adhesive material on the flaps of such envelops, and, further, into coaction with the stamp-affixing mechanism by means whereof the stamp is affixed to the envelop and suitable pressure applied to permanently attach the same thereto. The envelops are then fed successively between coacting and continuously operating aprons whereby the moistened flaps are pressed into position against the body of the envelops, pressure being applied sufficiently long to assure the permanent sealing thereof. The stamps are affixed to the envelops while the later are passing through the machine, by stamping mechanism, including a stamp-affixing means and devices for feeding the stamps to the affixing means. The operation of the stamping mechanism is under the control of the advancing envelops, so that as each envelop is passed through the machine a stamp will be automatically advanced to the envelop and affixed thereto. In the preferred embodiment of the invention, the stamp-affixing means is a roller rotating continuously during the operation of the machine, and the automatic control of the stamping mechanism is effected by having the envelops control the operation of the stamp-feeding devices, so that each time an envelop is forwarded through the machine it will automatically cause operation of the stamp-feeding devices to feed a stamp to the continuously-operating stamp-affixing devices. The advancing envelops, therefore, automatically control the operation of the stamping mechanism by directly controlling the operation of the stamp-feeding devices; the advancing envelops also indirectly control the operation of the stamp-affixing devices, since these devices operate to affix stamps only when the stamps are fed thereto.

No claim is made herein to the specific form of envelop sealing mechanism as this mechanism is described and claimed in Patent No. 945,743 dated January 11, 1910, and forming a division hereof.

The invention is illustrated in the accompanying drawings, in which—

Figure 1 is a front elevation illustrating the mechanism on a scale of about one-half size; Fig. 2 is a vertical cross-section on the line 2—2 Fig. 1; Fig. 3 is a top plan view; Fig. 4 is a horizontal section on the line 4—4 Fig. 1, looking in the direction of the arrows adjacent to such line; Fig. 5 is a similar section on the line 5—5 Fig. 1, looking in the direction of the arrows adjacent to such line; Fig. 6 is a similar section on the line 6—6 Fig. 1, looking in the direction of the arrows adjacent to such line; Fig. 7 is a horizontal cross-section of the main shaft of the machine and its appurtenances, taken on the line 7—7 Fig. 2; Fig. 8 is a vertical section of such main shaft (both Figs. 7 and 8 being on a slightly enlarged scale); Fig. 9 is a diagrammatic view of the operating mechanism, partly in horizontal section centrally of the stamp-feeding devices; Fig. 10 is a sectional view of a portion of the apparatus on the line 10—10 Fig. 3; and Figs. 11, 12, 13 and 14 are detail views hereinafter to be referred to.

Referring to these drawings, in which similar letters of reference denote corresponding parts, A designates the base and B a shelf-plate over which the envelops are passed and by which certain of the parts are secured in operative position, as hereinafter stated more in detail. Generally speaking, in this embodiment of the invention, the actuating mechanism as a whole is located between the base A and shelf-plate B, the envelop-feeding mechanism, the stamp-feeding mechanism and the stamp-affixing mechanism being located above such shelf-plate B. The envelops are fed from left to right (Fig. 1), being collected by and passed through the aprons at the extreme right of the machine after the flaps have been moistened and the stamps affixed.

The main shaft C of the machine is best shown in Figs. 2, 6, 7 and 8. This shaft is journaled between the plates A and B and carries loosely mounted thereon a spiral gear $C^1$, to which power is transmitted by a worm $C^2$ carried by a shaft $C^3$, to which movement may be imparted either by hand or by means of a suitable motor. Mounted upon the same sleeve which carries the spiral gear $C^1$ is a spur-gear $C^4$, meshing with a similar gear $C^5$ on shaft $C^6$, hereinafter to be referred to. A pin $c$ depends from the under side of gear $C^4$, and to this is secured one end of a coil-spring $c^1$, the other end whereof is secured to the sleeve $c^2$ carrying the ratchet $c^3$. Also depending from the under side of said gear $C^4$ is a pin $c^4$ operating within a recess formed in said sleeve $c^2$. Underlying the ratchet $c^3$ is a disk $c^{18}$ keyed (Fig. 8) to the shaft C and between said disk and said gear $c^3$ is a locking plate $c^5$ having the tooth $c^6$ and upwardly projecting pins $c^7$, $c^8$.

D designates a locking pawl pivoted at $d$ upon the disk $c^{18}$ and having curved or beveled outer surfaces coacting with the pins $c^7$ and $c^8$ and a tooth $c^9$ coacting with the teeth of the ratchet $c^3$. Said locking plate is provided with a recess (Fig. 7) and within this is located a coil-spring $c^{10}$, one end whereof is secured to said locking plate, the other end being secured upon the upper surface of the disk $c^{18}$.

A detent mechanism (shown to the left in Fig. 7 and hereinafter described) coacts with the tooth $c^6$ on the locking plate $c^5$. When said detent and tooth are in engagement the movement of the shaft $C^3$ causes a continuous rotary movement of the spiral gear $C^1$, the gear $C^4$ and the ratchet $c^3$. When said tooth $c^6$ is released, however, from the detent the coil-spring $c^{10}$, moving the locking plate $c^5$, forces the pin $c^8$ into engagement with the pawl D, thereby moving the tooth $c^9$ of said pawl into engagement with the teeth of the ratchet $c^3$. Normally, the spring $c^1$ not being under tension the pin $c^4$ will be at the end of the recess in sleeve $c^2$ opposite that in which it is shown in Fig. 7. After the detent above referred to has been thrown out of engagement with the tooth $c^6$ the movement of the gear $C^4$ places said spring under tension thereby tending to revolve the ratchet $c^3$, the limit of its excursion being determined when the pin $c^4$ occupies the position shown in Fig. 7. During this excursion the tooth $c^9$ on the ratchet D has an opportunity to center itself in the teeth of said ratchet.

The detent mechanism above referred to is here shown as comprising a small disk $d^1$, having detent $d^2$ and trip-tooth $d^3$. Said disk is mounted in the upwardly extending arms $d^4$ and a spring $d^5$ tends to maintain the detent $d^2$ in the path of movement of the tooth $c^6$ of the locking plate $c^5$. Said disk $d^1$ is operated by a lever $d^6$ forming one of the two levers (the other being $d^7$) of a bell-crank pivoted upon the rock-shaft $d^8$ carried by the base plate A and hereinafter to be described. The tooth on the end of arm $d^6$ which coöperates with tooth $d^3$ may be integral with the arm or may be separately formed and pivoted thereon so as to yield somewhat, as shown at $d^9$, Figs. 1 and 8.

$C^8$ designates a cam carried by the shaft C and coacting with this is a stationarily mounted spring arm $C^9$. As the detent $d^2$ comes into coaction with the tooth $c^6$, the arm $C^9$ comes into contact with the cam $C^8$. The arm $C^9$ coacting frictionally with the cam $C^8$ holds shaft C against backward rotation under the stress of spring $c^{10}$ when the latter is extended by the movement of plate $c^5$ by detent $d^2$ since such backward movement of shaft C and disk $c^{18}$ would cause pin $c^8$ to actuate pawl D.

Keyed to the main shaft C and directly underlying the disk $c^{18}$ is a pinion $c^{11}$ meshing with an idler $c^{12}$ which in turn meshes with a pinion $c^{13}$ mounted on shaft $c^{14}$. Directly overlying said pinion $c^{13}$ is a disk $c^{15}$ having a notch, and directly overlying this disk is a mutilated gear $c^{16}$. Mounted on the shaft F is a stop-plate $f$ having locking teeth at its ends concaved on the same curvature as the portion of the periphery of disk $c^{15}$ joining the ends of the notch therein; this stop-plate coacts with the disk $c^{15}$, and directly overlying said stop plate is a pinion $c^{17}$, with which the said mutilated gear $c^{16}$ coacts, the mechanism thus described being of the general character of a Geneva stop such that one revolution of shaft $c^{14}$ rotates shaft F one-half of a revolution and then locks it against movement.

Mounted on the shaft $C^6$ near the base plate A is a pinion $e$ meshing with a larger pinion $e^1$ on a stub-shaft $e^2$, and directly overlying said pinion $e^1$ is a beveled pinion $e^3$, with which engages a similar pinion $e^4$ mounted on stub-shaft $e^5$ supported from the base plate A of the machine and carrying beveled pinion $e^6$ meshing with similar pinion $e^7$ on a shaft $e^8$ supported in suitable standard $e^9$ on the base plate of the machine and upon which is mounted a roll E. Said roll E forms one of a series of rolls (in this instance five being shown), the rolls $E^1$ being idlers, and over all the rolls of this series operates a preferably elastic belt or apron $E^2$. Said rolls $E^1$ are mounted in the side members $e^{10}$, $e^{11}$, of a frame carried by the base-plate A, as is also another series of rolls $E^3$ here shown as four in number and around which operates the elastic belt or apron $E^4$, a portion thereof being in contact with the elastic belt or apron $E^2$. The envelops having been acted upon as hereinafter described, pass between these belts or aprons and thence out of the machine.

Before concluding the description of the mechanism beneath the shelf-plate B, I will turn for clearness to a part of the mechanism overlying such plate, including the means for passing the envelop through the machine and the stamp-affixing device which coacts therewith.

$b$ designates a hinged extension of the shelf-plate B over which the envelops are fed. Such envelops are initially acted upon by the horizontal feed-roll G, the fluted periphery whereof operates through an opening in said plate B, and by the vertical feed-roll $G^1$. Said horizontal roll is mounted upon a shaft having a spiral gear $g$ meshing with a similar gear $g^1$, carried by a shaft $g^2$, on which the vertical feed-roll $G^1$ is mounted and which carries pinion $g^3$, to which movement is imparted as hereinafter explained. $g^4$ designates a clutch on said shaft $g^2$, and $g^5$ an annulus forming part of the upper member of said clutch. A lever $g^6$ carried by a rock-shaft $d^8$ coacts with said annulus so that upon the rocking of said shaft the clutch is released thereby bringing said shaft $g^2$ (and the feed-rolls G, $G^1$) to a standstill, the purpose whereof is as follows:—After an envelop has been fed over the shelf-plate B through the action of the horizontal feed-roll G and the vertical feed-roll $G^1$, it is desirable that said rolls be brought to rest since such envelops are gripped and further drawn through the machine by other rolls to which attention will presently be called. A trip mechanism, hereinafter described, is therefore employed, so that after the forward end of the envelop has been gripped by the feed-rolls in advance of the rolls G, $G^1$, the shaft $d^8$ will be rocked thereupon separating the two members of the clutch $g^4$ and bringing to rest not only the horizontal feed-roll G but also the vertical feed-roll $G^1$. $G^3$ designates the paper-stop, the same comprising two members holding between them tongues or fingers $G^4$, the object whereof is to preclude the passage of more than a single envelop at a time. Hinged at $h$ to one of the members of said stop is the bracket $h^1$ carrying a roll H, preferably rubber-covered and spring-pressed by means of a leaf-spring $h^2$. Coöperating with said roll H is a roll I and both of these are preferably recessed midway between their ends to permit operation of the trip mechanism mounted on the shaft $i$, by which the roll I is carried. Said shaft $i$ is mounted on the base plate A, passes through the shelf-plate B and is stepped in the top plate $B^1$.

The tripping mechanism above referred to comprises a bifurcate plate $i^1$ carried by a hub $i^2$ mounted upon the shaft $i$ (see Figs. 4 and 9). A rearwardly extending arm, $i^3$, is connected by means of rod $i^4$ with the upper end of the lever $d^7$, hereinbefore referred to as being carried by the rock-shaft $d^8$. Said plate $i^1$ lies in the path of movement of the advancing edge of the envelop, a tongue $i^5$ being carried by the bracket $h^1$ and coacting with the bifurcation in said plate to stiffen such advancing edge of the envelop in order that as the same is fed forward said plate may be rocked upon the shaft $i$ to thereby operate the rock-shaft $d^8$, as above described. It will thus be seen that upon the actuation of the said tripping device the movement of the shaft $d^8$ of the bell-crank lever opens the clutch mechanism $g^4$ on the shaft $g^2$, thereby bringing the rolls G and $G^1$ to rest. From this point on, the feeding of the envelop whose forward edge has passed the plate $i^1$ is therefore independent of said rolls G, $G^1$.

$i^8$ designates a clutch on the shaft $i$ normally in engaging position and provided merely to permit said shaft to rotate free from its actuating mechanism when the envelop is pulled rearwardly at a greater rate of speed than that at which the roll I is permitted to travel. Said shaft $i$ carries pinion $i^6$ driven by pinion $j^1$ and engaging with pinion $g^3$ through idler pinion $i^7$.

J designates a shaft which like shaft $i$ is mounted in the base-plate A, passes through the shelf-plate B and is stepped in the top plate $B^1$. Adjacent to its mounting in the base-plate it is provided with a pinion $j$ driven by the pinion $c^1$. The said pinion $j$ engages with the idler pinion $j^1$ which in turn meshes with the pinion $i^6$ on the shaft $i$. It will therefore be seen that the train of movement is through the pinions $c$, $e^1$, $j$, $j^1$, $i^6$, $i^7$ and $g^3$.

Above the shelf-plate B the shaft J is provided with the roll $J^1$ and coacting with this roll and opposite the same is a roll $J^2$. Roll $J^1$ is loose on shaft J and its upper edge is provided with teeth adapted to coact with the teeth of a tubular clutch-member splined on shaft J and pressed against roll $J^1$ by a spring as shown in Fig. 10; this arrangement is such that roll $J^1$ may turn freely on its shaft in a direction corresponding to that in which the envelops are fed actuated by the envelops, and it may also be driven in that direction by the shaft J. The shaft of said roll J² is carried by arms j² pivoted upon shaft j⁴ and spring-pressed toward engaging position in proximity to the roll J¹. The shaft j⁴ is supported in ears j⁵ forming part of the moistener-frame j³ hereinafter described. The roll J¹ being mounted on the shaft J carrying the pinion j which forms one of the gears in the main train of the machine (Figs. 4 and 6), this roll J¹ will be rotated continuously during the operation of the machine. Also since the roll J² is loosely mounted upon its shaft and pressed into engagement with the roll J¹ (Figs. 3 and 4), this roll J² will also be rotated continuously during the operation of the machine.

The shaft C⁶, heretofore referred to as one of the connections through which power is transmitted to the envelop-carrying aprons, is stepped in the base-plate A, passes through the shelf-plate B and is journaled in the top plate B¹. It is provided just below the shelf-plate B with the pinion C⁷, the purpose whereof will be presently referred to. Above the shelf-plate B and between the same and the top plate B¹, said shaft carries a roll, C¹⁸, of considerable diameter. Preferably the periphery of the roll C¹⁸, or a portion thereof, will be rubber-covered, as may also the rolls H and I. The roll C¹⁸, however, travels at a surface speed substantially higher than that of the other rolls, thereby feeding the envelops from the machine faster than the same are introduced to or fed through the machine.

Mounted opposite to and coacting with the roll C¹⁸, is a roll K mounted in a hinged bracket k hinged at k¹ to the ears j⁵ of the moistener frame. Said bracket is spring-pressed by means of a leaf-spring k², and has an extension or tail-piece k³, which serves to guide the envelops passing between the rolls C¹⁸ and K, permitting them to fall in proper position between the belts or aprons E², E⁴.

The moistening device comprises the water supply, the moistener proper supplied thereby, and a milled or knurled roll supporting the envelop flap in its passage between the same and the moistener proper and a drip cup or pan for the excess water.

L designates the water cup, which may be of any suitable construction and dimensions. It directly overlies the receptacle l, in which is preferably placed a pad of felt or other absorbent material, l¹. Preferably a detachable weight l² will bear by its own gravity upon the pad, and where this is employed such pad may be suitably perforated to receive the drip from the cup L. Directly beneath the receptacle l and moistening pad l¹, the shelf-plate B is cut away (see Fig. 5) and within this cut-away portion, operating in a plane coincident with the upper surface of the shelf-plate, lies a milled or knurled roll, l³, suitably supported in bearings beneath the plate B.

Normally and when no envelops are passing through the machine, the weight of the moistener pad l¹ is borne by the roll l³. As the envelop is passed into the machine, the flap being first opened at an angle to the body, such flap passes over the roll l³ and under the moistener l¹, whereby the adhesive substance on such flap is sufficiently moistened as to seal the envelop under pressure after the same has passed the moistening device just explained. The envelops to be sealed are arranged with their body-portions side by side and in a vertical plane and the flap of each envelop extending at a right angle to the body upon the plate b, the body-portion of the end envelop lying against the wall b¹. They are fed successively by rolls G and G¹ between rolls H and I to the moistener under which the flap passes and by which it is moistened. The body-portions of the envelops then pass between rolls J¹ and J² and rolls C⁸ and K, the flaps of the envelops remaining during this movement at a right angle to the body-portions; the mounting of the rolls J² and K is such that the flaps can pass under those rolls while the rolls coact with the body-portions of the envelops. After passing rolls C⁸ and K the envelops drop between the aprons E² and E⁴ and are carried along between them in such a way that the flaps are folded up against the body-portions and pressed against the same.

The mechanism as thus far described is that employed for sealing only; or, in conjunction with other mechanism hereinafter to be referred to, when it is desired to both seal an envelop and affix a stamp thereto.

The stamp-affixing mechanism is governed largely by the shaft F and, coacting with this, is an adjusting device, the operation whereof determines whether all the mechanism is to be brought into play in order to both seal the envelop and affix the stamp thereto, or whether the stamp-affixing mechanism is to be thrown out of operation in order to permit the machine to seal only. This mechanism comprises a hand-piece L¹, secured to and adapted to operate a shaft L² mounted in the base-plate A and shelf-plate B, and a cam-lever L³ carried by said shaft L² and coacting with one of the members of a clutch L⁴ on the shaft F. In the position in which these parts are shown in Fig. 6, the stamp-affixing mechanism, to be presently described in detail, is in operative position. To throw that mechanism to inoperative position, it is only necessary to press the hand-piece L¹, and thereupon bring the cam-lever L³ under and cause it to raise against the tension of a spring the upper member of the clutch $L^4$, whereupon the shaft F will be maintained at rest.

The stamp-affixing mechanism comprises not only means for feeding the stamps to the envelops and separating them from the strips into which they are divided, but also mechanism whereby the operation of feeding and separating such stamps will be dependent upon the passage of an envelop through the machine. In other words, the mechanism is such that no stamp will be fed unless there be an envelop in position to receive it. Moreover, this mechanism has the added function (when the machine is adjusted for both sealing and stamping) of precluding the passage of an envelop through the machine unless a stamp be in position for affixing thereto. This mechanism is best shown in Figs. 4, 5 and 9, although parts thereof may be seen in elevation and plan in Figs. 2 and 3.

The pinion $C^7$ on the shaft $C^6$ has heretofore been referred to. This meshes with a pinion $m$ carried (below the shelf-plate B) by a shaft M journaled in said shelf-plate B and in the top plate $B^1$. Said shaft also carries the crank-disk $m^1$ having the crank-pin $m^2$. Said crank-pin operates in an elongated slot $m^3$ formed in one end of a crank-arm $m^4$, the opposite end whereof is mounted loosely upon the shaft F. Secured to or formed integral with the end of said crank-arm $m^4$ so mounted, is a saddle $m^5$, provided at one end with the upwardly extending lug $m^6$ and at the other end with the upwardly extending pin $m^7$. The mechanism just described, as well as that coacting therewith, can best be understood from Figs. 9, 13 and 14, the first-named being to some extent diagrammatic, the shelf-plate B being shown in dotted lines for the sake of clearness. Directly overlying the saddle $m^5$ is a ratchet $m^8$. The lug $m^6$ and pin $m^7$ project upwardly on either side of said ratchet and the former into the path of movement of a vibrating plate N, also mounted upon said shaft F. On the under side of said vibrating plate N is a pawl $n$ coacting with the teeth of said ratchet $m^8$. The movement of said plate about the shaft F transmits motion to said ratchet $m^8$ and shaft F to which the ratchet is fixed and to a roll hereinafter described carried by shaft F above the shelf-plate B. Vibratory movement is transmitted to said plate N by the coaction of lug $m^6$ therewith, which moves said plate in one direction, movement in the reverse direction being imparted under the stress of the coil-spring $n^2$ and limited by the stop $n^3$. Obviously whether movement will be imparted to the ratchet $m^8$ by the vibration of said plate N depends upon the extent of movement of the latter. This in turn depends upon the presence or absence of a stamp in position to be affixed on an envelop passing through the machine.

O designates what I term a feeler. The same comprises an oscillating plate slotted to receive pins or screws $o$, whereby said feeler is movably secured to the side of a bracket $o^1$ mounted upon the post $o^2$ carried by the shelf-plate B. Said bracket $o^1$ is provided with a stud $o^3$ coacting with a cam $o^4$ carried by the shaft M, the effect whereof is to move said bracket upon the post $o^2$ toward and from said shaft M. Contact between said cam and stud is assured by the coil-spring $o^5$. The lateral movement so imparted, in addition to the longitudinal movement, of the feeler O prevents the forward edge thereof from buckling the stamp with which it coacts. $o^6$ designates an arm extending from said feeler O and $o^7$ a link connecting said arm with the vibrating plate N through the pin $o^8$.

The office of the feeler O is to move into and out of the path of movement of the stamp (indicated in dotted lines in Fig. 9) to determine, in manner hereinafter specified, whether the envelop-feeding mechanism as well as the mechanism for feeding another stamp shall be operated.

The shaft $L^2$ carrying the finger-piece $L^1$ and cam-lever $L^3$ for operating the clutch $L^4$ on the shaft F has heretofore been referred to. As shown in Fig. 9 this shaft carries, in addition to the cam-lever $L^3$, the cam-stud $p$, which coacts with the bell-crank P pivoted at $p^1$, the distant end thereof $p^2$ bearing operative relation to a pin $p^3$ projecting outwardly from the vibrating plate N. The correlation of the bell-crank lever P and said pin $p^3$ determines whether the stamp-affixing mechanism is to be brought into operation or not, the said mechanism being operative only when said plate N is permitted its greatest movement as heretofore indicated. When, therefore, the finger-piece $L^1$ is thrown to such position as that the retracting spring $p^4$ may rock the bell-crank upon its pivot, the movement of said plate is necessarily restricted with the result that it has insufficient throw to actuate the ratchet $m^8$ and thereby effect the feeding of a stamp. Even when said bell-crank is in the position in which it is illustrated in Fig. 9, however, the operation of said vibrating plate N is further governed by the presence or absence of a stamp in position opposite the path of movement of the feeler O as above indicated, for neither when the bell-crank P is thrown to non-stamping position, nor when the stamp is in the path of movement of said feeler, will plate N vibrate to a sufficient degree to move the ratchet $m^8$ and thereby feed another stamp from the receiver hereinafter described.

A further function of the vibrating plate N, not heretofore disclosed, is to govern the operation of the rolls whereby the envelops are fed to sealing and stamping position, the object being to preclude the passage of an envelop through the machine (when it is adjusted for both sealing and stamping or for stamping only), unless the affixing of the stamp be assured. This result is accomplished in the following manner. R indicates a vertical rock-shaft mounted between the base-plate A and shelf-plate B. Rigidly secured to this shaft is the clutch cam $r$, which, like the lever $g^6$, coacts with the annulus $g^5$ formed on one of the members of the clutch carried by the shaft $g^2$. It will be recalled that this clutch is operated by the striking of the advancing edge of an envelop against the tripping mechanism $i^1$, above described, so that the feed-rolls G, $G^1$ will not be operated after the envelop has been acted upon between the rolls H and I. The object of this is to allow for envelops of different lengths, said feed-rolls being restored to operation only after the envelop which has already passed them, no matter what its length, has been drawn out of the way. The mechanism now being described produces the same result so far as the feed-rolls G, $G^1$, are concerned, but with a different object, i. e., to preclude the feeding of an envelop (when the machine is arranged for stamping or for stamping and sealing), unless the stamp be in position to be affixed thereto. $r^1$ and $r^2$ designate toggle levers connected at the pivotal point $r^3$, the distant end of the lever $r^1$ being pivotally connected to a stud on the under side of the shelf-plate B, while the distant end of the lever $r^2$ is pivotally connected with a cam arm $r^4$ keyed or otherwise secured to the shaft R. $r^4$ designates a bell-crank lever pivoted upon the pivot-pin $r^3$, which connects the toggle levers $r^1$, $r^2$. One member of said bell-crank coacts with a stop $r^6$, while the other end coacts with a recess and shoulder $r^7$ formed in the vibrating plate N. Pivotally mounted upon the bell-crank $r^5$, and positioned thereon by means of the spring $r^8$, is an arm $r^9$, which operates against the curved edge of the plate N (but, being of greater thickness, extends below the same) and with which coacts the upwardly extending pin $m^7$ upon the saddle $m^5$. The arrangement of these parts is such that if saddle $m^5$ and plate N are reciprocated together, on the backward movement of plate N the end of arm $r^9$ will engage the curved edge of the plate directly overlying the stud $m^7$ and will be turned on its pivot against the tension of spring $r^8$ to such an extent that its end will not engage the stud $m^7$. However, if plate N is held against a backward movement coextensive with that of saddle $m^5$, the stud $m^7$ on the saddle will engage the end of arm $r^9$ and operate the same to buckle the toggle. When the finger piece $L^1$ has been thrown to stamping position (Fig. 9) and when the full degree of movement of the vibrating plate N is permitted by the feeler O, the toggle levers $r^1$, $r^2$, the bell-crank $r^5$, and the clutch cam $r$, occupy the position in which they are shown in said last-named figure. Should the movement of the plate N be restricted, however, either by the throwing of the finger-piece $L^1$ or by a stamp opposing the full degree of movement of the feeler O, then the next forward movement of the pin $m^7$, upon the saddle $m^5$, would bring it into coaction with the arm $r^9$, thereby rocking the bell-crank $r^5$ upon its pivot $r^3$, moving such pivotal point away from the stop $r^6$, to the right in Fig. 9, and raising the end of arm $r^4$, thus rocking the shaft R and removing the clutch cam $r$ from engagement with the annulus $g^5$ forming part of the clutch on the shaft $g^2$, which operates the feed-rolls G, $G^1$. The clutch cam $r$ is provided with a retractor $r^{10}$ and stop $r^{11}$. When the toggle-levers $r^1$, $r^2$, are in the position illustrated in Fig. 9 wherein the pivotal point $r^3$ is slightly to the left of a line joining the extreme ends of the toggle-links, they are locked against the tendency of the retractor $r^{10}$ which when the toggle-links are in this position tends to buckle the links so as to carry the pivot $r^3$ to the left and such movement is precluded by stops $r^6$. The toggle-links can only be released by the operation of the bell-crank $r^5$ which moves the pivot $r^3$ to the right, thereby straightening the toggle-links and then buckling them on the other side; the effect of this straightening movement on cam $r$ is negligible, but the buckling movement raises the end of arm $r^4$, rotates shaft R and swings the end of cam $r$ away from the clutch. The toggle-links are reset in the position shown in Fig. 9 by the shoulder $r^7$ of plate N, which when the plate is reciprocated engages the end of the bell-crank $r^5$.

The main shaft C carries, just below the shelf-plate B, a cam-wheel Q, having cam-tooth $q$ coacting with the bell-crank $Q^1$ pivoted at $q^1$ to a stud projecting from the under surface of the shelf-plate B, its end distant from the pivotal point coacting with an ear $m^{10}$ forming part of the vibrating plate N. Referring now to Fig. 9, illustrating the mechanism in stamping position, it will be understood that if under the influence of the movement $C^7$, $m$, $m^1$ and $m^4$ a stamp were passing across the path of movement of the feeler O, the operation of said feeler would interfere with the feed thereof. It is desirable, therefore, to retard the movement of said feeler during the passage of such stamp; and this is accomplished by the bell-crank $Q^1$, since the moment the shaft C starts to make its revolution, the cam-tooth $q$ is carried out of coaction with the bell-crank $Q^1$, the long arm of the latter being thereupon moved under the influence of the retracting spring $p^4$. Simultaneously the vibrating plate N is moved by the lug $m^6$; but were it not for the bell-crank $Q^1$, the reverse movement of said lug would permit the vibrating plate to return to the position illustrated in Fig. 9,—this meaning that the feeler O would be allowed to pass across the path of travel of the stamp. This return movement of the lug $m^6$ and plate N is precluded by the bell-crank $Q^1$, which follows up the ear $m^{10}$, preventing the plate from returning (under the influence of the coil-spring $n^2$) until after the stamp has progressed beyond the path of travel of the feeler O.

Most of the stamp-affixing mechanism thus far described, save the feeler, is located below the shelf-plate B. The rest of such mechanism, lying above such plate, can best be described by following the course of the stamps from the stamp receptacle through the various rolls, etc., actuated by the mechanism below the plate and above described.

S designates a horizontally swinging stamp receiver pivoted at $s$ upon a bracket extending outwardly from the shelf-plate B, the under side of said receiver being provided with bosses or roller bearings (as may be preferred) $s^1$, to facilitate the movement of said receiver upon said plate. Said receiver is provided with a hinged top or cover (Figs. 2, 3 and 12), the forward edge whereof, as here shown, is provided with a rib $s^2$, for the purpose presently explained. A chain and weight $s^3$, or other suitable means, may be employed to draw said receiver to the left (Fig. 3) to assure best results in feeding the stamps.

$s^4$ designates a series of long and narrow strips of oil board or other material, between which the strips of connected stamps are placed. These board strips are preferably provided with a recess coacting with the rib $s^2$ on the cover of the receiver, in order to properly position said board strips and prevent the same from being carried out of the receiver under the action of the stamp feed. The forward edge of each of the board strips is cut away (see Fig. 12), and in this cut-away portion operates a feed-sheave $s^5$ (Figs. 4, 9 and 10) carried upon a bracket extending from a screw-stud $s^6$ supported by the shelf-plate B. Around said sheave $s^5$ runs an endless belt $s^7$ (preferably of rubber), which passes also around a roll $s^8$ (Fig. 9) mounted upon a journal $s^9$ (Fig. 3), stepped at its lower end in a U-shaped bracket $s^{11}$ secured to the shelf-plate B, and its upper end in a similar U-shaped bracket $s^{10}$ (Fig. 3), said journal being adjusted by means of a set-screw. The roll $s^8$ is recessed for engagement with the belt $s^7$, so that its diameter both above and below said belt is substantially the same as the recessed portion referred to plus the belt itself. Said roll $s^8$ is arranged parallel with and in close juxtaposition to the shaft F, which passes through both of the U-shaped plates above referred to (Fig. 3) and is journaled at its extreme upper end in the top plate $B^1$. That portion of said shaft F between said U-shaped plates is milled or knurled (like the portions of the roll $s^8$ below and above the recessed portion which receives the belt $s^7$) to form a roll $s^{13}$ similar to the roll $s^8$, and immediately below the upper U-shaped plate $s^{10}$ is provided with a pinion $s^{12}$, coacting with a similar pinion carried by the roll $s^8$, whereby the movement of said shaft F will be transmitted to said roll $s^8$. At a point coincident with the cut-away portion of the lower U-shaped plate, the shelf-plate B is cut away to permit the passage of the pivot pin $o^8$ whereby the link $o^7$ of the feeler O is connected with the vibrating plate N.

$S^1$ designates a shaft mounted in suitable bearings in the top plate $B^1$ and shelf-plate B and extending below said shelf-plate, where it is provided with a pinion $S^2$ meshing with the pinion $S^3$ carried by the shaft F. Above the shelf-plate B said shaft passes through orifices in both the U-shaped plates above referred to and between said plates is provided with a roll $S^{20}$, milled or knurled similarly to the other two rolls just described. Also mounted between said U-shaped plates and parallel with and in juxtaposition to the roll last named, is another roll $S^4$ mounted upon a shaft $S^5$ adjustable in the upper U-shaped plate above referred to. It is driven by a pinion which meshes with a similar pinion carried by the shaft $S^1$.

The feeler O operates in close proximity to the two rolls last named. The forward edge of said feeler is toothed and coacts with a comb-plate $S^6$, having recesses suitably spaced to coact with the teeth on the forward edge of said comb-plate. Said plate is so arranged relatively to the path of travel of the stamp as to support the same when such stamp is impinged against by the advancing edge of the feeler.

$S^7$ designates a shaft journaled in the shelf-plate B and extending below said plate, where it is provided with a pinion $S^8$, driven by the pinion $S^9$ on shaft J. Above the shelf-plate B said shaft $S^7$ is provided with a milled or knurled roll $S^{21}$ extending in the same plane as the similarly constructed rolls above described. Also just above said shelf-plate B the shaft $S^7$ is provided with a pinion $S^{10}$, which meshes with another pinion $S^{11}$ carried by the core of a moistening roll $S^{12}$. Said core is open at its end, as shown in Fig. 3, to receive water from the water-cup $S^{14}$, through the tube $S^{15}$. Said core is provided with perforations whereby the water fed to the inside thereof may be transmitted to the felt or other covering, by which moisture is applied to the stamp. Said core is also provided with an axial opening for the pivot pin $S^{16}$, which supports the moistening roll and which projects upward through a small slot in the shelf-plate B, said pivot being carried by a spring-pressed arm $S^{17}$ loosely mounted upon the shaft $S^1$ and provided with spring $S^{18}$, which may readily be operated by a rod X connected thereto in order to withdraw the moistening roll $S^{12}$ from contact with the roll $S^{21}$ so that it can be raised off of its pivot-pin $S^{16}$, as for instance when the moistening roll needs cleansing.

The shaft J heretofore referred to as mounted in the base-plate A and shelf-plate B, extends upward above the latter and is journaled also in the top plate $B^1$. Between the shelf-plate B and the top plate $B^1$ said shaft carries the roller $J^1$, having preferably a rubber-covered periphery, and between this roller and said shaft there is a clutch, which permits the roller to operate faster than the shaft when the envelop has been seized by the high speed roll $C^3$, for delivery from the machine (see Figs. 3 and 4).

In the present instance the shaft $S^7$, being journaled in the shelf-plate B, the upper end thereof or of the roll carried thereby is centered by means of a screw-rod $S^{19}$. This carries a collar T, from which extends an arm $t$, whose end terminates in close proximity to the periphery of roll $J^1$. From this end of said arm depends a rod $t^2$ (see Fig. 11), affixed to which are strippers $t^2$, which extend backwardly in the direction of travel of the stamp and the office whereof is to prevent the stamp from adhering to the moistening roll and assure its passage between said strippers and said roll $J^1$, which affixes such stamp to the passing envelop. The stamp may be guided in such passage by guides W or such other equivalent means as may be desired.

The operation of the apparatus has been explained to a considerable extent in connection with the description of the various parts and needs only the following addition:— First, assuming that the apparatus is to be used for sealing only, the stamp-affixing mechanism having been thrown out of operation by means of the finger piece $L^1$ and the clutch cam $L^3$, a pile of envelops, each with its flap extended at an angle to the body, is fed over the extension $b$, the pile being pressed against the wall $b^1$ (through a vertical opening wherein the feed-roll $G^1$ operates), while the horizontal feed-roll G tends to force the entire lot of envelops against the frame $G^3$ and stop $G^4$. The feed-roll $G^1$ tends to press forward only the innermost, said stop $G^4$ precluding the passage of envelops outside such innermost envelop, and this forward feeding movement of such innermost envelop is continued until the forward edge thereof passes between the rolls H and I, when it comes in contact with the tripping device $i^1$, thereby (through arms $i^3$, $i^4$) rocking the shaft $d^8$, moving the lever $d^9$ and releasing the tooth $c^6$ of the locking plate $c^5$ from the detent or stop $d^2$. Thereupon said locking plate moves the tooth of the pawl D into coaction with the ratchet $c^3$, permitting the main shaft C to make one complete revolution before said tooth $c^6$ and detent $d^2$ come again into coaction. The rocking of said shaft $d^8$, by operating the clutch carried by the shaft $g^2$, throws out of operation the feed-rolls G, $G^1$, which thereupon cease to act upon the envelop, such envelop being carried from that point on, first, by the rolls H and I and then by the rolls $J^1$, $J^2$, and finally by the high speed roll $C^{18}$ and its coacting roll K, until it falls between the aprons $E^2$, $E^4$. The speed of the latter is so adjusted as that, while the envelops are fed thereto and discharged therefrom successively, several will preferably be passing between the aprons at a given time, in order that not only may the flaps be pressed firmly upon the bodies of the envelops, but also this pressure applied for a sufficient length of time to permit the adhesive material to become firmly set. If, now, the machine be adjusted, not only for sealing the envelops, but also affixing stamps thereto, the operation of the finger piece $L^1$ throws the clutch cam $L^3$ out of operative position, permitting the stamp-affixing mechanism to operate when power is transmitted thereto. The same operation as that heretofore traced takes place and in addition motion is transmitted to the shaft F, these being geared in the relation of two to one, there being one-half a revolution to the shaft F for every complete revolution of the main shaft C. The stamps having been torn into strips of even length and placed between the oil-boards $s^4$ so that the ends of the stamp strips shall coincide with the ends of such boards and the weight or other adjusting appliance for the receiver applied, the end of the endless belt $s^7$ entering the cut-away portion of the first oil-board will bear directly against the end of the first stamp strip and, when rotated, exert a tendency to withdraw the stamp from the receiver and feed it between the stamp-passing rolls.

The first movement that takes place due to the rotation of the main shaft C is through the pinions $C^7$ and $m$ to the slotted rocking arm $m^4$ and thence to the saddle-plate $m^5$. Assuming that no stamp is yet in position, the movement of the saddle-plate $m^5$ and its lug $m^6$ moves the vibrating plate N and, through the same, moves the ratchet $m^8$ to the extent of one tooth. The bell-crank $r^5$, the toggle-links and the parts associated therewith are in the positions shown in Fig. 9, thereby assuring the inoperative condition of the envelop-feeding rolls G, G¹, as hereinbefore explained, and if they are not in this position, on the first movement of plate N, the shoulder $r^7$ will engage the end of bell-crank $r^5$ and move the parts to the position illustrated. The movement of the ratchet $m^8$ transmits corresponding movement to the stamp-feeding belt $s^7$ and the rolls $s^8$, $s^{13}$, $S^{20}$ and $S^4$. The movement of the ratchet and other parts described is continued and a stamp fed forward and when it reaches the rolls $S^{20}$ and $S^4$ (operating at higher speed than the rolls $s^8$ and $s^{13}$) torn from the strip and passed forward in proximity to the comb-plate $S^6$. The moment it reaches this position, it blocks the full extent of movement of the feeler O (which has theretofore been oscillating), with the result that the movement of the plate N is restricted and the envelop-feeding rolls G, G' thereby, in manner heretofore explained, thrown to operative position. If now, no envelops be fed, the stamp adjacent to the comb-plate remains in that position, the restricted movement of the plate N driving the stamp-feeding rolls no farther. When, however, an envelop is fed forward by the rolls G, G¹ and its forward edge operates the trip $i^1$, the detent $d^2$ and tooth $c^6$ are released, with the result that a complete revolution of the shaft C causes one-half a revolution (corresponding to the length of a stamp) of the shaft F. The movement of the latter takes up the operation of the stamp-feeding and passing mechanism and as the envelop reaches proper position, its advancing edge past the affixing roll J¹, the stamp, moistened when passing the roll $S^{12}$, is fed thereto and impressed thereon, whereupon the envelop is passed from the machine in manner above described. In this cycle of movements, the tripping of the mechanism $i^1$, besides releasing the detent $d^2$ and tooth $c^6$, throws out the envelop-feeding rolls G, G¹, so that the movement of the envelop is independent of these from that time on. If, after the envelop whose course has thus been traced, has passed the stamp-affixing point, another stamp is in position, the operation proceeds as before. If not, the envelop feed is disabled until the proper positioning of the stamp again permits the envelop feed to operate as above described.

Among the more pertinent advantages in the mechanism hereinbefore described, attention is called to the following:—The use of envelops of a standard size is unnecessary, but on the contrary provision is made for sealing or stamping or both sealing and stamping envelops of varying length, this provision residing in the means for cutting off the initial feed of each envelop before more than a portion thereof has passed the location of the feed-rolls and these feed-rolls do not again become operative until the envelop first acted upon has passed beyond the tripping mechanism which coacts with the feed-roll clutch, thereby releasing such mechanism and clutch to restore the feed-rolls to operative position for the next envelop. Next, when the machine is adapted for both sealing and stamping, the feeding of an envelop when no stamp is in position for application thereto is precluded, since if the feeler O be permitted to make its full movement, the vibrating plate N will, as above described, operate the clutch of the feed-roll shaft and thereby throw the feed-rolls to inoperative position. Again, when the machine is adapted for both sealing and stamping, the feeding (and consequent waste) of a stamp under such conditions that an envelop cannot be passed forward to meet it is precluded, since before the stamp can be passed to the affixing roll J¹ the envelop must have operated the trip, thereby releasing the tooth $c^6$ of the locking plate $c^5$ from the detent or stop $d^2$, which thereupon carries the stamp (which has already been torn from the strip) forward into coaction with the affixing roll J¹, by means whereof the stamp is applied to the envelop. Moreover the halting of an envelop immediately after operating the trip and before proceeding to the proper point for the affixing of the stamp thereto, is precluded, since simultaneously with its operation of such trip the envelop is grasped by the rolls adjacent to the trip and these rolls having constant movement assure the passage of the envelop forward to the point where the stamp is placed in position thereon. I also attach importance to the arrangement of the rolls and aprons whereby the sealed or sealed and stamped envelops are delivered from the machine. The arrangement herein illustrated and described is such that the envelop is seized positively, the pressure tending to carry the envelop between the aprons being applied not only to the body of the envelop but also to the outstanding flap. Moreover, since these aprons are so constructed and arranged as to carry a series of envelops at a time, there is a substantial interval between the moment the envelop enters the aprons and the moment it leaves the same, during which constant pressure is applied to the envelop and the permanent sealing of the same assured.

It is to be understood that the use of the word "stamp" herein is not to be construed as limiting the invention to the affixing of postage-stamps to envelops, as the apparatus described is capable of efficient use in connection with address stamps or labels, the principal change necessary to adapt the machine for the latter use being the simple one of feeding the envelop a trifle farther before it is met by the stamp and either raising the envelop or depressing the stamp-affixing device to properly position the address stamp or label.

Having now described my invention, what I claim as new therein and desire to secure by Letters Patent is as follows:—

1. The combination with an envelop-feeding device and means for automatically affixing stamps to envelops so fed, of intermediate mechanism for throwing said feeding device out of operation upon the failure of a stamp to reach affixing position, substantially as set forth.

2. The combination with an envelop-feeding device, a stamp-feeding device, and means for affixing a stamp so fed to an envelop, of intermediate mechanism for throwing the parts to inoperative position upon the failure of an envelop or a stamp to reach stamp-affixing position, substantially as set forth.

3. The combination with a bed adapted to receive a plurality of envelops, of a feed-roll, means controlled by the passage of an envelop for throwing the same to inoperative position, and stamp-affixing mechanism including a device also coacting with said feed-roll to throw the same to inoperative position upon the failure of a stamp to reach affixing position, substantially as set forth.

4. The combination of a bed adapted to receive a plurality of envelops, a feeding device coacting therewith, mechanism for feeding stamps and affixing them to the envelops fed by said device, and means actuated automatically by the passage of an envelop for rendering said feeding device inoperative and for causing operation of said mechanism to affix a stamp to the envelop so fed, substantially as set forth.

5. The combination with a bed adapted to receive a plurality of envelops, and a feed-roll coacting successively with the envelops on such bed, of normally inoperative stamp-feeding mechanism, and a tripping device actuated by the passage of an envelop to throw said feed-roll temporarily to inoperative position and simultaneously to throw said stamp-feeding mechanism to operative position, substantially as set forth.

6. The combination with a bed adapted to receive a plurality of envelops, and a feed-roll coacting successively with the envelops on such bed, of normally inoperative stamp-feeding mechanism, and a tripping device actuated by the passage of an envelop to throw said feed-roll temporarily to inoperative position and simultaneously to throw said stamp-feeding mechanism to operative position if a stamp be in position to be affixed to said envelop, substantially as set forth.

7. The combination with a bed adapted to receive a plurality of envelops, of a feed-roll, a coacting clutch mechanism, a main shaft and operative connections between the same and said feed-roll through said clutch mechanism, a tripping device actuated by the advancing edge of an envelop fed by said feed-roll, and connections between the same and said clutch for throwing said feed-roll out of operation after an envelop has been fed by said feed-roll and during its passage in proximity thereto, substantially as set forth.

8. The combination with envelop-feeding and stamp-affixing mechanism, of a main shaft and operative connections between the same and said envelop-feeding mechanism and said stamp-affixing mechanism, and means for operating said envelop-feeding mechanism to feed an envelop independently of the operation of said stamp-affixing mechanism, and means actuated by the envelops for controlling the connection of said shaft to the stamp-affixing mechanism so that the shaft may actuate said affixing mechanism independently of the envelops, substantially as set forth.

9. The combination with envelop-feeding and sealing apparatus, including a feed-roll coacting successively with the envelops passed therethrough, of normally inoperative stamping mechanism, a main power-shaft, connections between the same and said feeding and sealing apparatus and said stamping mechanism, and means controlled by the passage of an envelop through said feeding and sealing apparatus for throwing said feed-roll out of operation and simultaneously throwing said stamping mechanism into operation through a detent and stop mechanism governing the transmission of power from said main shaft to said stamping mechanism, substantially as set forth.

10. The combination with a bed adapted to receive a plurality of envelops and a feed-roll adjacent to said bed and coacting with said envelops, of a main power-shaft, stamp-feeding mechanism operated thereby and adapted to feed a stamp to a certain point, and means for assuring the retention of said stamp at such point until an envelop be fed forward to receive it, substantially as set forth.

11. The combination with a main shaft, and stamp-feeding mechanism operated by said main shaft to feed stamps successively to a certain point only, of intermittent mechanism also driven by said main shaft for further moving the stamps from the position named to stamp-affixing position, a detent and stop device governing such intermittent operation, and means controlled by the passage of an envelop to stamp-affixing position for actuating said detent and stop device, substantially as set forth.

12. The combination with envelop-feeding apparatus, of mechanism for feeding and affixing stamps to envelops fed thereby, such mechanism including a feeler operating in the line of travel of such stamps, and connections between said feeler and said envelop-feeding apparatus, whereby the movement of the former will determine the operation of the latter, substantially as set forth.

13. The combination with envelop-feeding apparatus, of mechanism for feeding and affixing stamps to envelops fed thereby, such mechanism including a vibrating plate and a coacting feeler operating in the path of movement of such stamps, and connections between said feeler, said plate and said envelop-feeding apparatus, whereby when the assumption by a stamp of operative position restricts the movement of said feeler and plate said envelop-feeding apparatus will be thrown to operative position, substantially as set forth.

14. The combination with envelop-feeding apparatus, of mechanism for feeding and affixing stamps to envelops fed thereby, such mechanism including a vibrating plate and a coacting feeler operating in the path of movement of such stamps, and connections between said feeler, said plate and said envelop-feeding apparatus, whereby when the failure of a stamp to reach operative position permits the full extent of movement of said feeler and vibrating plate, said envelop-feeding apparatus will be thrown to inoperative position, substantially as set forth.

15. The combination with a main power-shaft, of stamp-feeding rolls, a pawl and ratchet movement for operating the same to feed the stamps to a certain position only, a vibrating pawl-carrying plate upon the shaft carrying said ratchet, an oscillating feeler connected with said plate, means for precluding the passage of the foremost stamp beyond the point named when said plate and feeler have their full degree of movement, and means for passing such foremost stamp to affixing position and correspondingly advancing another stamp to the point named upon the restriction of the movement of said plate and feeler and consequent actuation of said ratchet independently of the pawl carried by said plate, substantially as set forth.

16. The combination with a shaft having a ratchet and oscillating saddle mounted thereon, a vibrating plate having a pawl coacting with said ratchet, and a device for operating said plate upon the movement of said saddle, of stamp-feeding rolls actuated by said shaft, certain thereof having greater surface speed than certain others in order to separate the stamps from the strips, an envelop-feeding roll having a clutch device, and connections between said clutch device and said plate, whereby the movement of the latter will determine the operative or inoperative condition of the former, substantially as set forth.

17. The combination with stamp-feeding mechanism, including rolls for passing stamps successively to affixing position and separating them meanwhile from the strip, of an oscillating feeler operating in the path of travel of said stamps, an envelop-feeding device, and means coacting with said feeler independently of the stamp for disabling said feeler and assuring operative condition of said device, substantially as set forth.

18. The combination with stamp-feeding rolls and a shaft for transmitting movement thereto, of a ratchet and saddle carried by said shaft, a vibrating plate also carried by said shaft and having a pawl coacting with said ratchet, an envelop-feeding device and means for throwing the same to operative and inoperative conditions, and connections whereby such conditions are determined by the movement of said plate, substantially as set forth.

19. The combination with stamp-feeding rolls and a shaft for transmitting movement thereto, of a ratchet and saddle carried by said shaft, a vibrating plate also carried by said shaft and having a pawl coacting with said ratchet, a feeler connected with said plate and operating in the path of travel of the stamps between said rolls, said feeler coacting with a comb-plate, an envelop-feeding device and means for throwing the same to operative and inoperative conditions, and connections whereby such conditions are determined by the movement of said plate and feeler, substantially as set forth.

20. The combination with envelop-feeding and sealing apparatus, of mechanism for affixing a stamp to envelops fed thereby, means for tearing a stamp from a strip and feeding it to a certain point, and tripping mechanism actuated by the advancing edge of the envelop for throwing the envelop-feeding device out of operation and simultaneously releasing a portion of the stamp-feeding mechanism, whereby such stamp may be fed from the point named to meet and be affixed to the envelop by which the tripping device was operated, substantially as set forth.

21. The combination of a stamp-receptacle having a series of stamp strips therein, partitions arranged between such strips and having recesses, a feed-sheave coacting with such strips through the recesses in such partitions, means for changing the relation between said feed-sheave and said strips, means for severing the stamps of the strips, a moistener for the stamps, a stamp-affixing roller to which the stamps are fed, and means for feeding envelops successively to said roller to receive said stamps, substantially as set forth.

22. The combination of a stamp-receptacle having a series of stamp strips therein, partitions arranged between such strips and having recesses, a feed-sheave coacting with such strips through the recesses in such partitions, means for changing the relation between said feed-sheave and said strips and for moving said stamp-receptacle relatively to said feed-sheave, means for severing the stamps of the strips, a moistener for the stamps, a stamp-affixing roller to which the stamps are fed, and means for feeding envelops successively to said roller to receive said stamps, substantially as set forth.

23. The combination of a stamp-receptacle having a series of stamp strips therein, partitions arranged between such strips and having recesses, means for maintaining said partitions in register, a feed-sheave coacting with said strips through the recesses in said partitions, means for moving said stamp-receptacle relatively to said feed-sheave, means for severing the stamps of the strips, a moistener for the stamps, a stamp-affixing roller to which the stamps are fed, and means for feeding envelops successively to said roller to receive said stamps, substantially as set forth.

24. The combination of a stamp receptacle having a plurality of stamp strips arranged side by side therein, means for feeding said strips successively, a pair of rolls adapted to receive and forward a strip so fed, a second pair of rolls in advance of the first-named rolls and operating at higher surface speed, said rolls being adapted to tear a stamp from the end of said strip and feed the same forward, a moistener for the stamps, a stamp-affixing roller to which the stamps are fed, and means for feeding envelops successively to said roller to receive the stamps, substantially as set forth.

25. The combination with means for feeding a stamp strip and separating from the strip and further feeding the foremost stamp thereof, of a feeler operating across the path of travel of such separated stamp and whose movement will be restricted by the impact thereof against said stamp, envelop-feeding mechanism and a connection between the same and said feeler, a moistening roll coacting with the gummed side of the stamp, a stripping mechanism for precluding adhesion of said stamp to said moistening roll, and an affixing roll to which the moistened stamp is fed for pressing such stamp into position upon an envelop passed to stamp-affixing position by said envelop-feeding mechanism, substantially as set forth.

26. The combination with means for feeding a stamp strip and separating from the strip and further feeding the foremost stamp thereof, of a feeler operating across the path of travel of such separated stamp and whose movement will be restricted by the impact thereof against said stamp, envelop-feeding mechanism and a connection between the same and said feeler, a moistening roll coacting with the gummed side of the stamp, a stripping mechanism for precluding adhesion of said stamp to said moistening roll, an affixing roll to which the moistened stamp is fed for pressing such stamp into position upon an envelop passed to stamp-affixing position by said envelop-feeding mechanism, said affixing roll being positively driven at a certain rate but free to move upon its axis at a higher rate, and an envelop-passing roll operating at higher surface speed than said affixing roll and coacting with such envelop after the same has passed such affixing roll, substantially as set forth.

27. The combination with stamp-affixing mechanism, of a bed adapted to receive a plurality of envelops, a feed-roll, means controlled by the passage of an envelop for throwing the same out of operation, a paper-stopping device for precluding the passage of more than one envelop at a time, a flap-moistener and means for passing an envelop in operative relation to said flap-moistener and in juxtaposition to said stamp-affixing mechanism, and means for delivering the envelop, both sealed and stamped, from the machine, substantially as set forth.

28. The combination of a magazine or carrier for containing a stack of envelops, a feeder operable to discharge envelops successively from the stack, means for moving envelops in the same plane subsequent to the operation of the feeder thereon, suitable sealing means, a flap moistener situated between the feeder and the sealing devices, and means for affixing stamps to the envelops prior to the action of the sealing devices thereon.

29. In an envelop sealing and stamping machine, the combination of an envelop moistening and sealing mechanism, means for automatically feeding the envelop through the machine, and stamp moistening and sealing mechanism automatically actuated by the advancing envelop.

30. In an envelop sealing and stamping machine, mechanism for moistening and sealing an envelop, in combination with means for advancing said envelop to the stamping mechanism, a stamp moistening roller, means actuated by the advancing envelop for automatically bringing the gummed surface of a stamp into contact with said roller, and means for advancing it to the envelop and sealing the stamp and envelop together, substantially as described.

31. In an envelop sealing and stamping machine, mechanism for moistening and sealing an envelop, in combination with means for advancing said envelop to the stamping mechanism, means for advancing the stamps, means actuated by the advancing envelops for controlling the operation of said means for advancing the stamps, and means for moistening and rolling a stamp upon each envelop as it is advancing through the machine.

32. In an envelop sealing and stamping machine, the combination of the envelop moistening and sealing mechanism and means for uninterruptedly advancing an envelop through the machine, with stamping mechanism comprising a stamp holder and mechanism automatically operated by each advancing envelop to advance a stamp, means for severing the stamp, a moistening roll over which the stamp is advanced to meet the advancing envelop, and rollers for sealing the advancing stamp and envelop together.

33. In a stamp-affixing apparatus, the combination of a stamp-affixing member, mechanism for feeding envelops to said member, mechanism for feeding stamps to said member, and means controlled by the feeding of the envelops for operating said mechanisms alternately, substantially as described.

34. An envelop-stamping machine comprising rollers for forwarding the envelops, a second set of rollers for forwarding the envelops at higher speed than said rollers, means for affixing stamps to the envelops so fed, and means actuated by the envelops fed by said rollers for controlling the operation of said stamp-affixing means, substantially as set forth.

35. The combination of a support for a pile of envelops, means for feeding envelops successively from said support, forwarding means for continuing the movement of the envelops begun by said feeding means but at higher speed than that at which the envelops are fed by the feeding means, stamp-affixing means, and means actuated by the envelops fed by said envelop-feeding means for controlling the operation of said stamp-affixing means, substantially as set forth.

36. The combination of means for feeding envelops automatically along a predetermined path, a power shaft connected thereto, a stamp-support, means for feeding stamps from said support along a predetermined path intercepting the path along which the envelops are fed, means for moistening the stamps so that they will become affixed to the envelops, connections between the power shaft and said stamp-feeding means whereby the shaft may actuate the stamp-feeding means, a make-and-break device in said connections, and a device projecting into the path along which the envelops are fed by said feeding means and operated by an envelop for controlling said make-and-break device to connect the power shaft in driving relation to the stamp-feeding means when an envelop is fed thereto, substantially as set forth.

37. The combination of a support for a pile of envelops, means for feeding envelops successively from said support at varying intervals of time, forwarding devices additional to said feeding means arranged to forward the envelops at higher speed than that at which they are moved by said feeding means, stamp-affixing means, and means actuated by the envelops fed by said envelop-feeding means for controlling the operation of said stamp-affixing means, substantially as set forth.

38. The combination of a plurality of pairs of rollers for feeding envelops along a predetermined path, means for feeding stamps along a path intercepting the path of the envelops, means for moistening the stamps so that they will become affixed to the envelops, means actuated directly by the advancing envelops for controlling the operation of said stamp-feeding means, means for moistening the flaps of the envelops and means for sealing the flaps, substantially as set forth.

39. An envelop-stamping machine comprising two sets of envelop-forwarding rollers for forwarding envelops along a predetermined path, one set forwarding the envelops at higher speed than the other, means for feeding stamps along a path intercepting the path of the envelops, means for moistening the stamps, and means actuated by the advancing envelops for controlling the operation of said stamp-feeding means, substantially as set forth.

40. The combination of means for supporting a pile of envelops, means for automatically feeding envelops from said support successively, means for forwarding the envelops along a predetermined path at higher speed than that at which they are fed, the movement of the envelops effected by the feeding means and forwarding means being continuous, means for feeding stamps along a path intercepting the path of the envelops, means for moistening the stamps, and means operated by the advancing envelops for controlling the operation of the stamp-feeding means, substantially as set forth.

41. The combination of means for supporting a pile of envelops, means for automatically feeding envelops on edge from said support successively, forwarding means for continuing the movement of the envelops so fed along a substantially straight course at higher speed than that at which they are fed, means for feeding stamps along a path intercepting the path of the envelops, means for moistening the stamps, means operated by the advancing envelops for controlling the operation of the stamp-feeding means, means for moistening the envelop flaps, and means for sealing the flaps, substantially as set forth.

42. An envelop-stamping machine comprising rollers for forwarding the envelops, a second set of rollers for forwarding the envelops at higher speed than said rollers, means for affixing stamps to the envelops so fed, a detent projecting into the path of the envelops between said sets of rollers and operated by the advancing envelops, and means actuated by said detent for controlling the operation of said stamp-affixing means, substantially as set forth.

43. The combination of a support for a pile of envelops, means for feeding envelops successively from said support, means for forwarding the envelops at higher speed than that at which they are fed, stamp-affixing means, a detent projecting into the path of the envelops between said envelop-feeding and said envelop-forwarding means and operated by the advancing envelops, and means actuated by said detent for controlling the operation of said stamp-affixing means, substantially as set forth.

44. The combination of a support for a pile of envelops, means for feeding envelops successively from said support, means for forwarding the envelops at higher speed than that at which they are fed, stamp-affixing means, stamp-feeding means, and means dependent upon the presence of a stamp in a predetermined position for controlling the operation of said envelop-feeding means, substantially as set forth.

45. The combination of means for supporting a pile of envelops, means for automatically feeding envelops from said support successively, means for forwarding the envelops along a predetermined path at higher speed than that at which they are fed, means for feeding stamps along a path intercepting the path of the envelops, means for moistening the stamps, a detent projecting into the path of the envelops between said envelop-feeding and said envelop-forwarding means and operated by the advancing envelops, and means actuated by said detent for controlling the operation of said stamp-affixing means, substantially as set forth.

46. The combination of means for feeding envelops automatically along a predetermined path, a power shaft connected thereto, a stamp-support, means for feeding stamps from said support along a predetermined path intercepting the path along which the envelops are fed, means for moistening the stamps, a roller mounted at the intersection of said paths and adapted to roll the moistened stamps upon the envelops as the latter are moved by said envelop-feeding means, connections between the power shaft and said stamp-feeding means whereby the shaft may actuate the stamp-feeding means, a make-and-break device in said connections and a device projecting into the path along which the envelops are fed by said feeding means and operated by an envelop for controlling said make-and-break device to connect the power shaft in driving relation to the stamp-feeding means when an envelop is fed thereto, substantially as set forth.

47. The combination of a support for a plurality of envelops, means for automatically feeding envelops successively from said support along a predetermined path, a power shaft connected to and adapted to operate said means, means for feeding stamps successively along a path intercepting said path, connections between the power shaft and said stamp-feeding means whereby the shaft operates said means, means for moistening the stamps, and a roller mounted at the intersection of said paths and adapted to roll the moistened stamps upon the envelops as the latter are moved by said envelop feeding means, substantially as set forth.

48. The combination of a support for a plurality of envelops, means for automatically feeding envelops successively from said support along a predetermined path, a power shaft connected to and adapted to operate said means, means for feeding stamps successively along a path intersecting said path, connections between the power shaft and said stamp feeding means whereby the shaft operates said means, means for moistening the stamps, a roller mounted at the intersection of said paths and adapted to roll the moistened stamps upon the envelops as the latter are moved by said envelop feeding means, a flap-moistener, and means for sealing the envelop flaps, substantially as set forth.

49. The combination of a support for a plurality of envelops, means for automatically feeding envelops from said support along a predetermined path, a power shaft connected to said means, a stamp-support, means for feeding stamps from said support along a predetermined path intercepting the path along which the envelops are fed, means for moistening the stamps so that they will become affixed to the envelops, connections between the power shaft and said stamp-feeding means whereby the shaft may actuate the stamp-feeding means, a make-and-break device in said connections and means operated by an envelop fed by said envelop-feeding means for controlling said make-and-break device to connect the power shaft in driving relation to the stamp-feeding means when an envelop is fed thereto, substantially as set forth.

50. The combination of a support for a plurality of envelops, means for automatically feeding envelops from said support along a predetermined path, a power shaft connected to said means, a stamp-support, means for feeding stamps from said support along a predetermined path intercepting the path along which the envelops are fed, means for moistening the stamps so that they will become affixed to the envelops, connections between the power shaft and said stamp-feeding means whereby the shaft may actuate the stamp-feeding means, a make-and-break device in said connections, means operated by an envelop fed by said envelop-feeding means for controlling said make-and-break device to connect the power shaft in driving relation to the stamp-feeding means when an envelop is fed thereto, a moistener for the flaps of the envelops and means for sealing the envelop flaps, substantially as set forth.

51. The combination of a support for a pile of envelops, means for automatically feeding envelops from said support successively, means for forwarding the envelops along a predetermined path, means for feeding stamps along a path intercepting said path, means for moistening the stamps, a roller mounted at the junction of said paths and adapted to roll a stamp upon an envelop, and means dependent upon the presence of a stamp in a predetermined position for controlling the operation of said envelop-feeding means, substantially as set forth.

52. The combination of a support for a pile of envelops, means for automatically feeding envelops from said support successively, forwarding means for continuing the movement of the envelops so fed along a predetermined path, power-driven devices for feeding stamps along a path intercepting said path, means for moistening the stamps, a power-driven roller mounted at the junction of said paths and adapted to roll a stamp upon an envelop, means actuated by the envelops fed by said envelop-feeding means for controlling the application of power to said stamp-feeding devices, means for moistening the flaps of the envelops, and means for sealing the flaps, substantially as set forth.

53. The combination of a support for a pile of envelops, means for automatically feeding envelops from said support successively at varying intervals of time, means for forwarding the envelops along a predetermined path, means for feeding stamps along a path intercepting said path, means for moistening the stamps, a roller mounted at the junction of said paths and adapted to roll a stamp upon an envelop, means actuated directly by the envelops fed by said envelop-feeding means for controlling the operation of said stamp-feeding means, means for moistening the envelop flaps, and means for sealing the flaps, substantially as set forth.

54. The combination of a support for a pile of envelops, means for automatically feeding envelops successively therefrom edgewise along a predetermined path, means for feeding stamps edgewise along a path intersecting said path, a pair of rollers mounted at the junction of said paths between which the stamps and envelops pass, a moistener for the stamps, means actuated by the envelops forwarded by said envelop-feeding means for controlling the operation of said stamp-affixing means, a moistener for the envelop-flaps, and means for sealing the envelop-flaps, substantially as set forth.

55. The combination of means for feeding envelops, means for forwarding the envelops so fed edgewise along a predetermined path at higher speed than that at which they are fed, means for feeding stamps edgewise along a path intercepting said path, a pair of rollers at the junction of said paths between which the envelops and stamps pass, a moistener for the stamps, and means located between said envelop-feeding and said envelop-forwarding means actuated by an advancing envelop and controlling the operation of said stamp-feeding means, substantially as set forth.

56. The combination of a support for a pile of envelops, means for automatically feeding the envelops successively from said support edgewise along a predetermined path, means for feeding stamps edgewise along a path intercepting said path, a moistening roll on one side of said stamp path, a roller on the opposite side of said stamp path at the junction of said path with the envelop path, a roller with which said last-named roller coacts mounted on the opposite side of the envelop path, means for severing the stamps, and a detent projecting into the path of the envelops and actuated thereby to permit operation of the stamp-feeding means only when an envelop is fed, substantially as set forth.

57. The combination of a support for a pile of envelops, means for feeding envelops successively from said support, forwarding means for continuing the movement of the envelops begun by said feeding means but at higher speed than that at which the envelops are fed by the feeding means, stamp-affixing means, stamp-moistening means, means actuated by the advancing envelops for controlling the operation of said stamp-affixing means, a flap-moistener, and means for sealing the envelop-flaps, substantially as set forth.

58. The combination of a set of rollers for forwarding envelops, a second set of rollers for forwarding the envelops at higher speed than said rollers and along a predetermined path, means for feeding stamps along a path intercepting said path for the envelops, stamp-moistening means, means located between said sets of rollers actuated by the advancing envelops and controlling the operation of said stamp-feeding means, and a roller at the junction of said paths for rolling the moistened stamps upon the envelops, substantially as set forth.

59. The combination of a support for a pile of envelops, means for automatically feeding envelops therefrom successively, means for forwarding the envelops along a predetermined path at higher speed than that at which they are fed, means for feeding stamps along a path intercepting said path, a stamp-moistener, means located between said envelop-feeding means and said envelop-forwarding means actuated by the advancing envelops and controlling the operation of said stamp-feeding means, and a roller at the junction of said paths for rolling the moistened stamps upon the envelops, substantially as set forth.

60. The combination of a support for a pile of envelops, rollers for automatically feeding envelops successively from said support edgewise along a predetermined path, a support for a stamp-strip, means for feeding the stamp-strip edgewise along a path intercepting said path, means for severing individual stamps from said strip, a stamp-moistener, and means actuated by the advancing envelops for controlling the operation of said stamp-feeding means, substantially as set forth.

61. The combination of a support for a pile of envelops, rollers for automatically feeding envelops successively from said support edgewise along a predetermined path, a support for a stamp-strip, means for feeding the stamp-strip edgewise along a path intercepting said path, means for severing individual stamps from said strip, a stamp-moistener, a roller mounted at the junction of said paths and adapted to roll the moistened stamps upon the envelops, and means actuated by the advancing envelops for controlling the operation of said stamp-feeding means, substantially as set forth.

62. The combination of a support for a pile of envelops, means for automatically feeding envelops successively from said support edgewise along a predetermined path, a support for a stamp-strip, means for feeding said strip edgewise along a path intercepting said path, means for severing individual stamps from said strip, a moistening roll on one side of said stamp path, a roller on the opposite side of said stamp path at the junction thereof with said envelop path, a roller with which said roller coacts mounted on the opposite side of the envelop path, and means actuated by the advancing envelops for controlling the operation of said stamp-feeding means, substantially as set forth.

63. The combination of means for forwarding envelops successively, a support for a plurality of stamps, means for feeding the stamps successively and affixing them to the envelops forwarded by said envelop-forwarding means, and means for assuring the affixing of the first stamp fed by said stamp-feeding means to the first envelop forwarded by said envelop-forwarding means, substantially as set forth.

64. The combination of means for forwarding envelops successively along a predetermined path, a support for a plurality of stamps, means for feeding the stamps successively along a path intercepting said path, means for severing the stamps, a stamp-moistener, a roller at the junction of said paths, a member coacting with said roller and mounted on the opposite side of the envelop path so that the stamps and envelops pass between it and said roller, and means for assuring the affixing of the first stamp fed by said stamp-feeding means to the first envelop forwarded by said envelop-forwarding means, substantially as set forth.

65. A stamp-affixing machine having a support for a plurality of envelops, means for automatically feeding the envelops from said support successively, means for forwarding the envelops so fed through the machine, a support for a plurality of stamps, means for automatically feeding the stamps from said support successively and affixing them to the envelops fed by said envelop-feeding means, and means for insuring the affixing of the first stamp fed by said stamp-feeding means to the first envelop fed by said envelop-feeding means, substantially as set forth.

66. The combination of a support for a pile of envelops, means for automatically feeding the envelops from said support successively, means for forwarding the envelops along a predetermined path, means for feeding stamps successively, means for affixing the stamps to the envelops, and means dependent upon the presence of a stamp in a predetermined position for controlling the operation of said envelop-feeding means, substantially as set forth.

67. The combination of a support for a pile of envelops, rollers for automatically feeding envelops from said support successively, rotatable forwarding devices for continuing the movement of the envelops so fed, a stamp-moistener, means for affixing the stamps to the envelops, means operated by the advancing envelops for controlling the operation of the stamp-affixing means, a flap-moistener and a flap-sealer, substantially as set forth.

68. The combination of a support for a pile of envelops, means for automatically feeding the envelops edgewise from said support successively, means for forwarding the envelops on edge, means for feeding stamps successively on edge along a path intercepting the path of the envelops, means for affixing the stamps to the envelops, and means operated by the advancing envelops for controlling the operation of the stamp-affixing means, substantially as set forth.

69. The combination of a support for a pile of envelops, rollers for automatically feeding envelops edgewise from said support successively, means for forwarding the envelops on edge, means for feeding stamps edgewise successively, a stamp-moistener, means for affixing the stamps to the envelops, means operated by the advancing envelops for controlling the operation of the stamp-affixing means, a flap-moistener, and means for sealing the flaps, substantially as set forth.

70. A stamp-affixing machine comprising means for forwarding envelops by a continuous movement through the machine successively, a support for a plurality of stamps, means for feeding the stamps successively by a continuous movement from said support through the machine and affixing them to the envelops during such movement, and means actuated by the advancing envelops for controlling the operation of said stamp-feeding means, substantially as set forth.

71. A stamp-affixing machine comprising the combination of a support for a pile of envelops, means for automatically feeding the envelops by a continuous movement successively from said support through the machine, a support for a plurality of stamps, means for feeding the stamps successively by a continuous movement from said stamp-support through the machine and affixing them to the envelops during such movement, and means actuated by the advancing envelops for controlling the operation of said stamp-feeding means, substantially as set forth.

72. An envelop-sealing and stamp-affixing machine comprising the combination of a support for a pile of envelops, means for automatically feeding the envelops by a continuous movement successive from said support through the machine, a support for a plurality of stamps, means for feeding the stamps successively by a continuous movement from said stamp-support through the machine and affixing them to the envelops during such movement, means actuated by the advancing envelops for controlling the operation of said stamp-feeding means, means for moistening the envelop-flaps, and flap-sealing means, substantially as set forth.

73. In a machine of the type set forth, the combination with a stamping mechanism, and means for feeding the envelop to the stamping mechanism, of a clutch mechanism automatically controlled by the passage of the envelop for throwing the feeding means into inoperative condition and the stamping mechanism into operative condition.

74. In a machine of the type set forth, the combination with a stamping mechanism, and means for feeding an envelop to the stamping mechanism, of a clutch mechanism for throwing the feeding means into inoperative condition and the stamping mechanism into operative condition.

75. The combination of a support for a pile of envelops, envelop-feeding means for feeding envelops intermittently from said support, a continuously-operating stamp-affixing element for affixing stamps to the envelops so fed, stamp-feeding mechanism acting intermittently to feed stamps successively to the continuously-operating affixing element, and means actuated by the envelops successively advanced by said envelop-feeding means for controlling the operation of the stamp-feeding mechanism to feed stamps to the affixing element, substantially as set forth.

76. A stamp-affixing machine having a support for a plurality of envelops, means for feeding the envelops successively through the machine, means for feeding stamps successively, a stamp-moistener, a roller for rolling the stamps upon the envelops while the latter are being forwarded through the machine, and means for insuring the affixing of the first stamp fed by said stamp feeding means to the first envelop fed by said envelop-feeding means, substantially as set forth.

77. The combination of a power-shaft, a support for a pile of envelops, envelop-feeding means for feeding envelops from said support connected to the power-shaft and operated thereby, a stamp-affixing element for affixing stamps to the envelops so fed connected to the power-shaft and operated thereby continuously when said envelop-feeding means is in operation, stamp-feeding mechanism for feeding stamps to the affixing element operating intermittently during the continuous operation of the affixing element, and means controlled by the envelops fed by said envelop-feeding means for connecting the power-shaft in driving relation to said stamp-feeding mechanism, substantially as set forth.

78. The combination of a support for a pile of envelops, means for feeding the envelops successively therefrom, a moistener for the envelop-flaps, means for sealing the flaps, a continuously operating stamp-affixing element for affixing stamps to the envelops fed by said means, a feeding mechanism for a stamp-strip operating intermittently to carry stamps successively to the continuously-operating affixing element, means for severing the stamps of the stamp-strip, and means actuated by the envelops successively advanced by the envelop-feeding means for controlling the operation of the stamp-feeding mechanism to feed stamps to the stamp-affixing element, substantially as set forth.

79. The combination of a support for a pile of envelops, a power-shaft, envelop-feeding mechanism connected thereto and operated thereby for feeding envelops successively from said support and through the machine, a moistener for the envelop-flaps, means for sealing the envelop-flaps, a stamp-affixing element connected to the power-shaft and continuously rotated thereby when the envelop-feeding mechanism is operated, stamp-feeding mechanism for feeding stamps to the affixing element, and means controlled by the advancing envelops fed by the envelop-feeding mechanism for intermittently connecting the power-shaft in driving relation to the stamp-feeding mechanism, substantially as set forth.

80. The combination of a support for a pile of envelops, means for automatically feeding envelops successively at varying intervals of time from said support edgewise along a predetermined path, means for feeding stamps edgewise along a path intercepting said path, a pair of rollers mounted at the junction of said paths, between which the stamps and envelops pass, a moistener for the stamps, and means actuated directly by the envelops forwarded by said envelop-feeding means for controlling the operation of said stamp-affixing means, substantially as set forth.

81. The combination of a support for a pile of envelops, means for automatically feeding envelops successively at varying intervals of time from said support and along a predetermined path, a support for a stamp-strip, means for feeding the stamp-strip along a path intercepting said path, means for severing individual stamps from said strip, a stamp-moistener, means actuated directly by the advancing envelops for controlling the operation of said stamp-feeding means, a moistener for the flaps of the envelops and means for sealing the flaps, substantially as set forth.

82. The combination of a support for a pile of envelops, means for automatically feeding envelops successively at varying intervals of time from said support and along a predetermined path, means for feeding stamps along a path intersecting said path, a roller at the junction of said paths adapted to roll a stamp upon an envelop while the latter is moving uninterruptedly past the roller, and means actuated directly by the envelops fed from said support for controlling the operation of the stamping mechanism, substantially as set forth.

83. The combination of a support for a pile of envelops, envelop-feeding means for automatically feeding envelops successively from said support at varying intervals of time, a continuously-operating stamp-affixing element for affixing stamps to the envelops so fed, stamp-feeding mechanism acting intermittently to feed stamps successively to the continuously-operating affixing element, and means actuated directly by the envelops successively advanced by said envelop-feeding means for controlling the operation of the stamp-feeding mechanism to feed stamps to the affixing element, substantially as set forth.

84. The combination of a power-shaft, a support for a pile of envelops, envelop-feeding means for feeding envelops from said support successively at varying intervals of time connected to the power-shaft and operated thereby, a stamp-affixing element for affixing stamps to the envelops so fed connected to the power-shaft and operated thereby continuously when said envelop-feeding means is in operation, stamp-feeding mechanism for feeding stamps to the affixing element operating intermittently during the continuous operation of the affixing element, and means operated directly by the envelops fed by said envelop-feeding means for connecting the power-shaft in driving relation to said stamp-feeding mechanism, substantially as set forth.

This specification signed and witnessed this 11th day of August, 1904.

ERNEST J. BRASSEUR.

Witnesses:
S. O. EDMONDS,
I. McINTOSH.

It is hereby certified that in Letters Patent No. 1,002,194, granted August 29, 1911, upon the application of Ernest J. Brasseur, of Chicago, Illinois, for an improvement in "Envelop Sealing and Stamping Apparatus," errors appear in the printed specification requiring correction as follows: Page 16, lines 119–120, the words "rotatable forwarding devices for continuing the movement of the envelops so fed" should be stricken out and the words *means for forwarding the envelops* inserted instead; same page, line 130, and page 17, line 1, the words "means for forwarding the envelops on edge" should be stricken out and the words *rotatable forwarding devices for continuing the movement of the envelops so fed* be inserted instead; and that the said Letters Patent should be read with these corrections therein that the same may conform to the record of the case in the Patent Office.

Signed and sealed this 10th day of October, A. D., 1911.

[SEAL.]

E. B. MOORE,
*Commissioner of Patents.* advanced by the envelop-feeding means for controlling the operation of the stamp-feeding mechanism to feed stamps to the stamp-affixing element, substantially as set forth.

79. The combination of a support for a pile of envelops, a power-shaft, envelop-feeding mechanism connected thereto and operated thereby for feeding envelops successively from said support and through the machine, a moistener for the envelop-flaps, means for sealing the envelop-flaps, a stamp-affixing element connected to the power-shaft and continuously rotated thereby when the envelop-feeding mechanism is operated, stamp-feeding mechanism for feeding stamps to the affixing element, and means controlled by the advancing envelops fed by the envelop-feeding mechanism for intermittently connecting the power-shaft in driving relation to the stamp-feeding mechanism, substantially as set forth.

80. The combination of a support for a pile of envelops, means for automatically feeding envelops successively at varying intervals of time from said support edgewise along a predetermined path, means for feeding stamps edgewise along a path intercepting said path, a pair of rollers mounted at the junction of said paths, between which the stamps and envelops pass, a moistener for the stamps, and means actuated directly by the envelops forwarded by said envelop-feeding means for controlling the operation of said stamp-affixing means, substantially as set forth.

81. The combination of a support for a pile of envelops, means for automatically feeding envelops successively at varying intervals of time from said support and along a predetermined path, a support for a stamp-strip, means for feeding the stamp-strip along a path intercepting said path, means for severing individual stamps from said strip, a stamp-moistener, means actuated directly by the advancing envelops for controlling the operation of said stamp-feeding means, a moistener for the flaps of the envelops and means for sealing the flaps, substantially as set forth.

82. The combination of a support for a pile of envelops, means for automatically feeding envelops successively at varying intervals of time from said support and along a predetermined path, means for feeding stamps along a path intersecting said path, a roller at the junction of said paths adapted to roll a stamp upon an envelop while the latter is moving uninterruptedly past the roller, and means actuated directly by the envelops fed from said support for controlling the operation of the stamping mechanism, substantially as set forth.

83. The combination of a support for a pile of envelops, envelop-feeding means for automatically feeding envelops successively from said support at varying intervals of time, a continuously-operating stamp-affixing element for affixing stamps to the envelops so fed, stamp-feeding mechanism acting intermittently to feed stamps successively to the continuously-operating affixing element, and means actuated directly by the envelops successively advanced by said envelop-feeding means for controlling the operation of the stamp-feeding mechanism to feed stamps to the affixing element, substantially as set forth.

84. The combination of a power-shaft, a support for a pile of envelops, envelop-feeding means for feeding envelops from said support successively at varying intervals of time connected to the power-shaft and operated thereby, a stamp-affixing element for affixing stamps to the envelops so fed connected to the power-shaft and operated thereby continuously when said envelop-feeding means is in operation, stamp-feeding mechanism for feeding stamps to the affixing element operating intermittently during the continuous operation of the affixing element, and means operated directly by the envelops fed by said envelop-feeding means for connecting the power-shaft in driving relation to said stamp-feeding mechanism, substantially as set forth.

This specification signed and witnessed this 11th day of August, 1904.

ERNEST J. BRASSEUR.

Witnesses:
S. O. EDMONDS,
I. McINTOSH.

It is hereby certified that in Letters Patent No. 1,002,194, granted August 29, 1911, upon the application of Ernest J. Brasseur, of Chicago, Illinois, for an improvement in "Envelop Sealing and Stamping Apparatus," errors appear in the printed specification requiring correction as follows: Page 16, lines 119-120, the words "rotatable forwarding devices for continuing the movement of the envelops so fed" should be stricken out and the words *means for forwarding the envelops* inserted instead; same page, line 130, and page 17, line 1, the words "means for forwarding the envelops on edge" should be stricken out and the words *rotatable forwarding devices for continuing the movement of the envelops so fed* be inserted instead; and that the said Letters Patent should be read with these corrections therein that the same may conform to the record of the case in the Patent Office.

Signed and sealed this 10th day of October, A. D., 1911.

[SEAL.]

E. B. MOORE,
*Commissioner of Patents.*

It is hereby certified that in Letters Patent No. 1,002,194, granted August 29, 1911, upon the application of Ernest J. Brasseur, of Chicago, Illinois, for an improvement in "Envelop Sealing and Stamping Apparatus," errors appear in the printed specification requiring correction as follows: Page 16, lines 119-120, the words "rotatable forwarding devices for continuing the movement of the envelops so fed" should be stricken out and the words *means for forwarding the envelops* inserted instead; same page, line 130, and page 17, line 1, the words "means for forwarding the envelops on edge" should be stricken out and the words *rotatable forwarding devices for continuing the movement of the envelops so fed* be inserted instead; and that the said Letters Patent should be read with these corrections therein that the same may conform to the record of the case in the Patent Office.

Signed and sealed this 10th day of October, A. D., 1911.

[SEAL.]

E. B. MOORE,
*Commissioner of Patents.*